(12) United States Patent
Kim

(10) Patent No.: US 9,191,606 B2
(45) Date of Patent: Nov. 17, 2015

(54) MOBILE TERMINAL, BROADCASTING TERMINAL AND CONTROLLING METHOD THEREOF

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/762,204

(22) Filed: Feb. 7, 2013

(65) Prior Publication Data

US 2014/0028918 A1    Jan. 30, 2014

(30) Foreign Application Priority Data

Oct. 17, 2012   (KR) .................. 10-2012-0115377

(51) Int. Cl.
*H04N 7/18* (2006.01)
*H04N 5/44* (2011.01)
(Continued)

(52) U.S. Cl.
CPC ............. *H04N 5/4403* (2013.01); *H04H 60/33* (2013.01); *H04H 60/45* (2013.01); *H04N 21/4222* (2013.01); *H04N 21/42207* (2013.01); *H04N 21/42209* (2013.01); *H04N 21/42222* (2013.01); *H04N 21/42224* (2013.01); *H04N 21/42226* (2013.01); *H04N 21/4316* (2013.01); *H04N 21/4325* (2013.01); *H04N 21/4334* (2013.01); *H04N 21/43637* (2013.01); *H04N 21/441* (2013.01); *H04N 21/4438* (2013.01); *H04N 21/4532* (2013.01); *H04N 21/4583* (2013.01); *H04N 21/4661* (2013.01); *H04N 21/4668* (2013.01); *H04N 21/4751* (2013.01); *H04N 21/4753* (2013.01); *H04N 21/47214* (2013.01); *H04N 21/4826* (2013.01); *H04N 21/4858* (2013.01); *H04N 21/4882* (2013.01); *H04H 60/46* (2013.01); *H04N 21/812* (2013.01)

(58) Field of Classification Search
CPC   H04N 21/43615; H04N 7/106; H04N 5/4401
USPC .............. 725/37–61, 80, 131–134, 139–142; 709/217–232; 348/734
See application file for complete search history.

(56) References Cited

U.S. PATENT DOCUMENTS 4,845,564 A * 7/1989 Hakamada et al. ........... 348/565
5,734,589 A * 3/1998 Kostreski et al. ............. 715/716
(Continued)

OTHER PUBLICATIONS

"Philips Prestigo Universal remote control SRU6006 6 in 1", Retrieved from the Internet: URL:http://www.p4c.Philips.com/cgi-bin/cpindex.pl?ctn=SRU6006/27&HLT=Link+_UserManuals &mid=Lir Jan. 1, 2014, retrieved on May 13, 2014, 1 page, XP55117832.

(Continued)

*Primary Examiner* — Annan Shang
(74) *Attorney, Agent, or Firm* — Birch, Stewart, Kolasch & Birch, LLP

(57) ABSTRACT

A mobile terminal including a display unit configured to display information; a memory configured to store channel information; a wireless communication unit configured to wirelessly communicate with a broadcasting terminal; an a controller configured to transmit a turn-on control signal to the broadcasting terminal for turning on the broadcasting terminal, and transmit the channel information to the broadcasting terminal to control the broadcasting terminal to output a broadcast content received on a broadcast channel matched to the transmitted channel information when the broadcasting terminal is turned on.

28 Claims, 27 Drawing Sheets

(51) Int. Cl.
*H04H 60/33* (2008.01)
*H04H 60/45* (2008.01)
*H04N 21/422* (2011.01)
*H04N 21/431* (2011.01)
*H04N 21/432* (2011.01)
*H04N 21/433* (2011.01)
*H04N 21/4363* (2011.01)
*H04N 21/441* (2011.01)
*H04N 21/443* (2011.01)
*H04N 21/45* (2011.01)
*H04N 21/458* (2011.01)
*H04N 21/466* (2011.01)
*H04N 21/472* (2011.01)
*H04N 21/475* (2011.01)
*H04N 21/482* (2011.01)
*H04N 21/485* (2011.01)
*H04N 21/488* (2011.01)
*H04H 60/46* (2008.01)
*H04N 21/81* (2011.01)

(56) References Cited

U.S. PATENT DOCUMENTS

| | | | |
|---|---|---|---|
| 6,130,726 A | | 10/2000 | Darbee et al. |
| 6,177,931 B1 * | | 1/2001 | Alexander et al. ............... 725/52 |
| 6,374,406 B2 * | | 4/2002 | Hirata ........................... 725/132 |
| 8,253,867 B2 * | | 8/2012 | Hornback et al. ............. 348/734 |
| 2003/0061606 A1 * | | 3/2003 | Hartwig et al. .................. 725/25 |
| 2004/0049779 A1 | | 3/2004 | Sjoblom et al. |
| 2007/0094715 A1 | | 4/2007 | Brown et al. |
| 2009/0237573 A1 | | 9/2009 | Hornback et al. |
| 2009/0322946 A1 | | 12/2009 | Kitashou |
| 2011/0069940 A1 | | 3/2011 | Shimy et al. |

OTHER PUBLICATIONS

"Prestigo-Configo", Retrieved from the Internet: URL:http://download.p4c.philips.com/files/s/sru6006_27/sru6006_27_dfu_eng.pdf, retrieved on May 13, 2014, 49 pages, XP055117830.

* cited by examiner

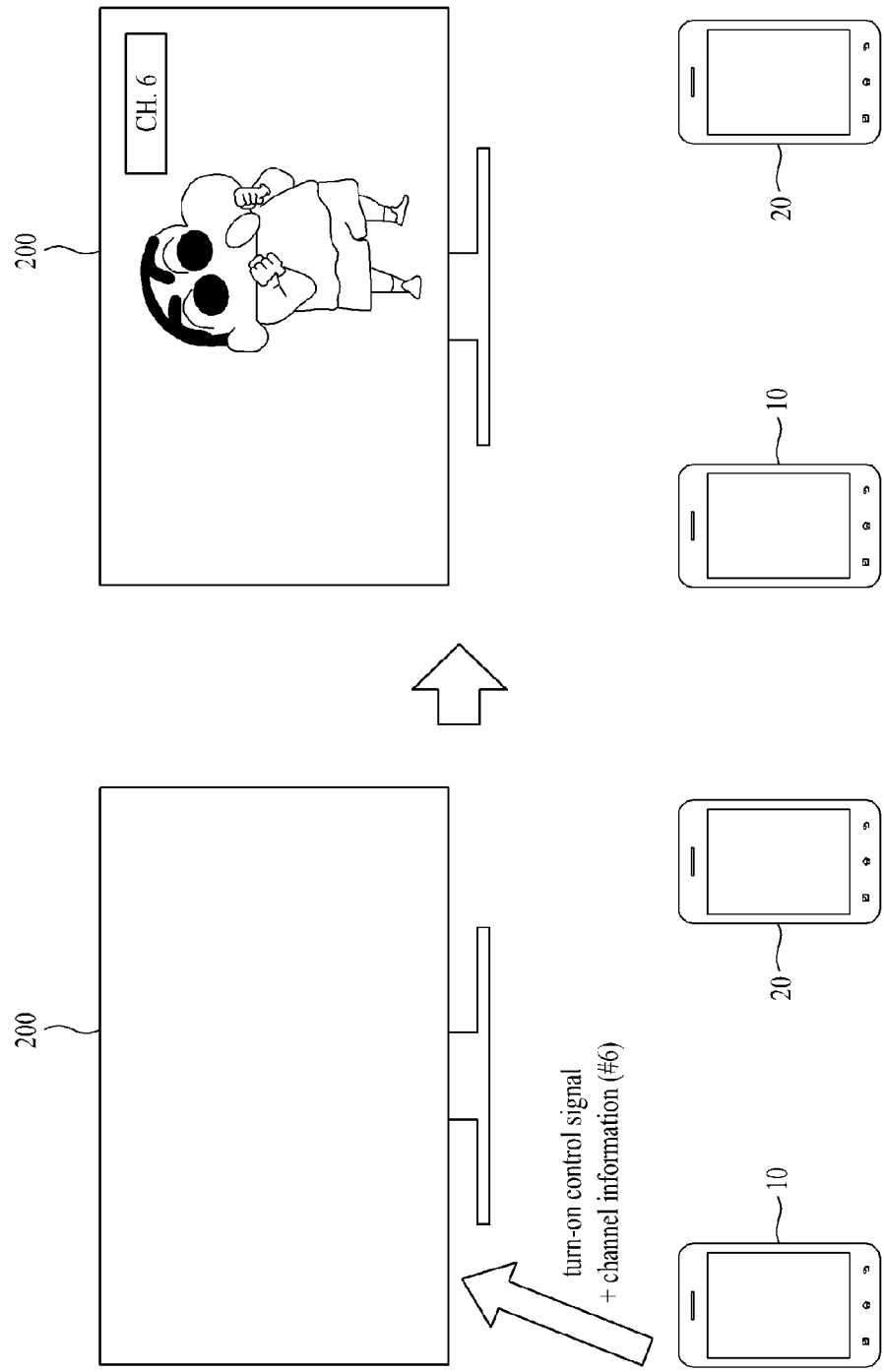

FIG. 15
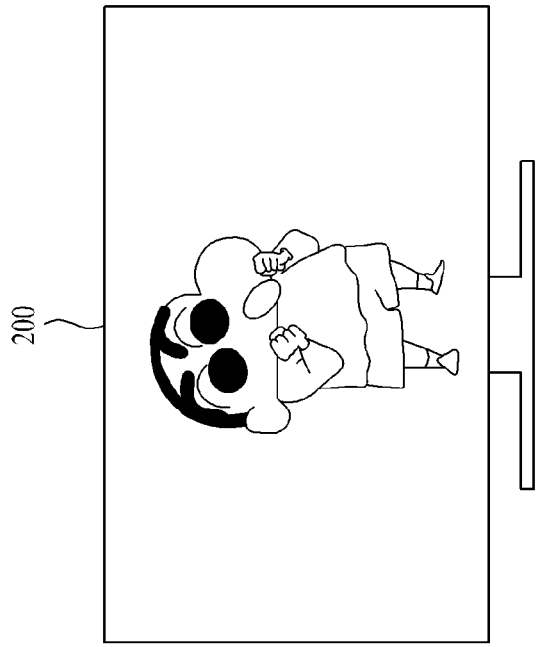
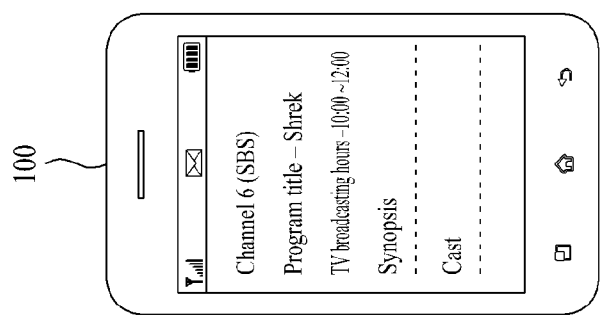

MOBILE TERMINAL, BROADCASTING TERMINAL AND CONTROLLING METHOD THEREOF

Pursuant to 35 U.S.C. §119(a), this application claims the benefit of earlier filing date and right of priority to Korean Application No. 10-2012-0115377, filed on Oct. 17, 2012, the contents of which are hereby incorporated by reference herein in their entirety.

BACKGROUND OF THE INVENTION

1. Field of the Invention

The present invention relates to a mobile terminal, and more particularly, to a mobile terminal, broadcasting terminal and controlling method thereof. Although the present invention is suitable for a wide scope of applications, it is particularly suitable for the mobile terminal to remotely control the broadcasting terminal that is a remote control target of the mobile terminal.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it can consider the improvement of structural part and/or software part of the terminal.

As functions of a terminal are diversified, attempts to use the terminal for daily lives gradually increase. One of the attempts is to utilize a mobile terminal as a TV remove controller. In order to utilize the mobile terminal as the TV remote controller, a user installs a remote controller application in the mobile terminal. However, since a remote controller application of a related art is just capable of performing such a simple function as a channel switching, a volume adjustment, an external input setting and the like, the related art remote controller application is not suitable for controlling operations of a smart TV having lately attracted consideration attention.

Moreover, when a TV is turned on, since the same screen is always displayed on the TV no matter who is a terminal user, a user's taste or preference is not taken into consideration. Moreover, when a plurality of terminals attempt to control a single TV, control authority collision or priority settings have problems.

SUMMARY OF THE INVENTION

Accordingly, embodiments of the present invention are directed to a mobile terminal, broadcasting terminal and controlling method thereof that substantially obviate one or more problems due to limitations and disadvantages of the related art.

One object of the present invention is to provide a mobile terminal, broadcasting terminal and controlling method thereof, by which user's convenience in manipulation can be enhanced.

Another object of the present invention is to provide a mobile terminal, broadcasting terminal and controlling method thereof, by which customized information suitable for a current remote controller user can be displayed on the broadcasting terminal.

A further object of the present invention is to provide a mobile terminal, broadcasting terminal and controlling method thereof, by which control authorities can be distributed to a plurality of mobile terminals when a plurality of the mobile terminals are connected to the broadcasting terminal.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a display unit configured to display information, a memory configured to store channel information, a wireless communication unit configured to perform a wireless communication with a broadcasting terminal, and a controller controlling a turn-on control signal for switching a state of the broadcasting terminal to a turned-on state and the channel information to be provided to the broadcasting terminal in order for the broadcasting terminal to output a broadcast content received on a broadcast channel matched to the channel information in the course of being turned on.

In another aspect of the present invention, a broadcasting terminal according to the present invention may include a display unit configured to display information, a memory configured to store data, a broadcast receiving unit configured to receive a broadcast signal from a broadcast managing server, a wireless communication unit configured to receive a turn-on control signal and channel information from a first mobile terminal, and a controller, if a turned-on state is switched to a turned-on state in response to the turn-on control signal, controlling a first broadcast content received on a broadcast channel matched to the channel information to be displayed.

In another aspect of the present invention, a method of controlling a mobile terminal according to the present invention may include the steps of requesting a connection to a broadcasting terminal and if the connection to the broadcast terminal is completed, providing the broadcasting terminal with a turn-on control signal for switching a state of the broadcasting terminal to a turned-on state and channel information in order for the broadcasting terminal to output a broadcast content received on a broadcast channel matched to the channel information in the course of being turned on.

In a further aspect of the present invention, a method of controlling a mobile terminal according to the present invention may include the steps of receiving a turn-on control signal and channel information from a mobile terminal and if a turned-off state is switched to a turned-on state, controlling a broadcast content received on a broadcast channel matched to the channel information to be displayed.

Effects obtainable from the present invention is non-limited by the above mentioned effect. In addition, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 8A and FIG. 8B are diagrams for examples that a broadcasting terminal outputs a channel coinciding with channel information;

FIG. 15 is a diagram for one example of outputting a broadcast information via a mobile terminal;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except for a mobile terminal only, the configurations according to an embodiment described in this disclosure is applicable to such a stationary terminal as a digital TV, a desktop computer and the like.

Figure 1:
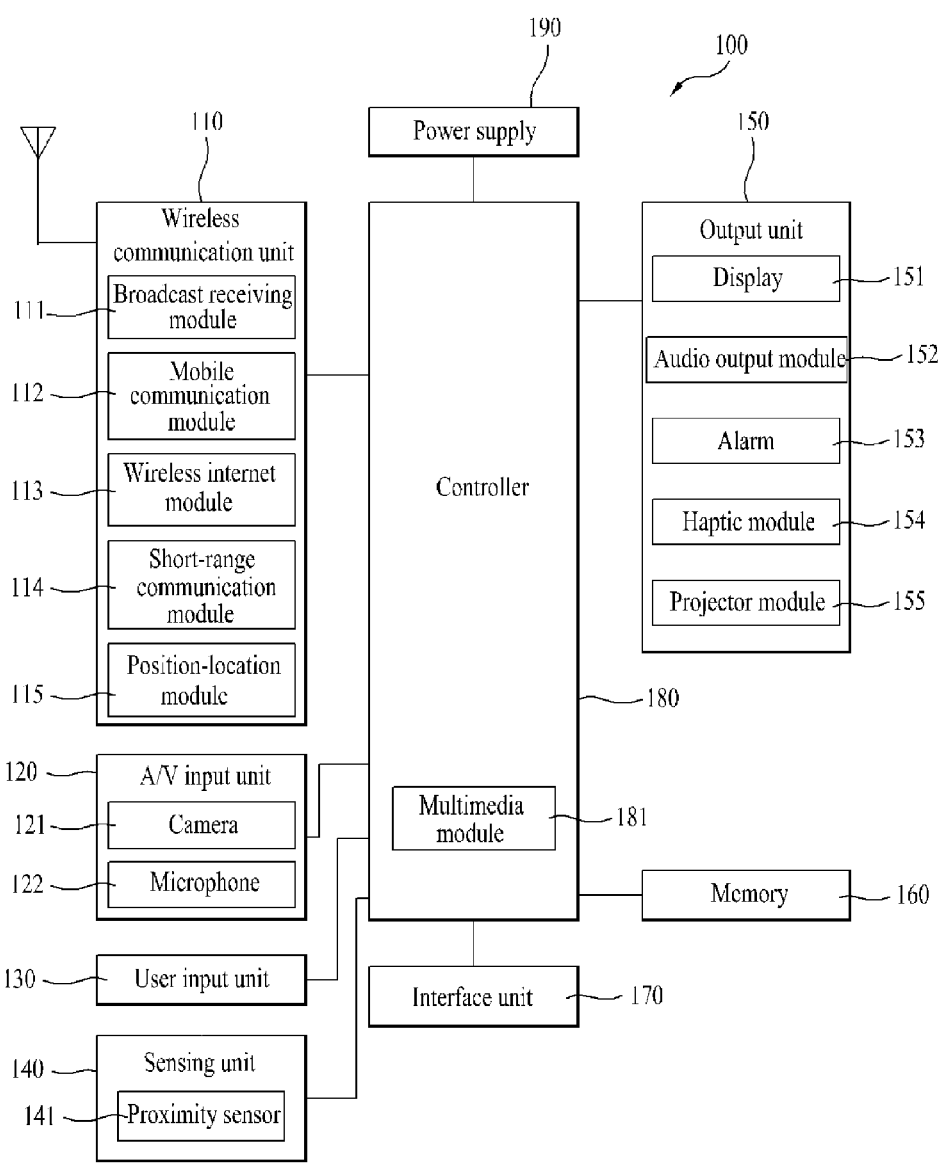
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 by being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it can use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing mechanism for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Figure 2:
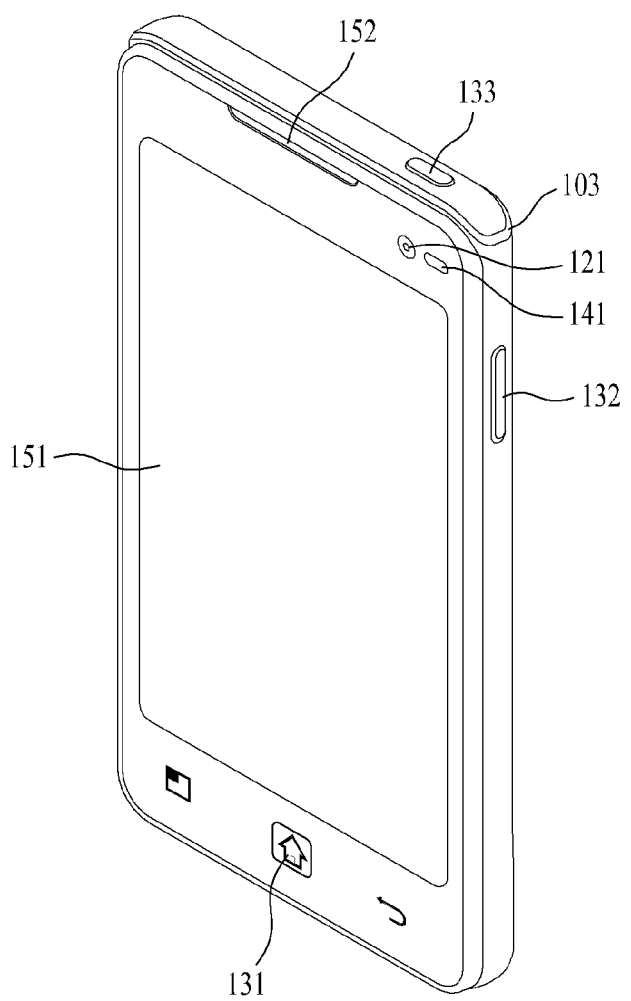
FIG. 2 is a front perspective diagram of a mobile terminal according to one embodiment of the present invention.
Figure 3:
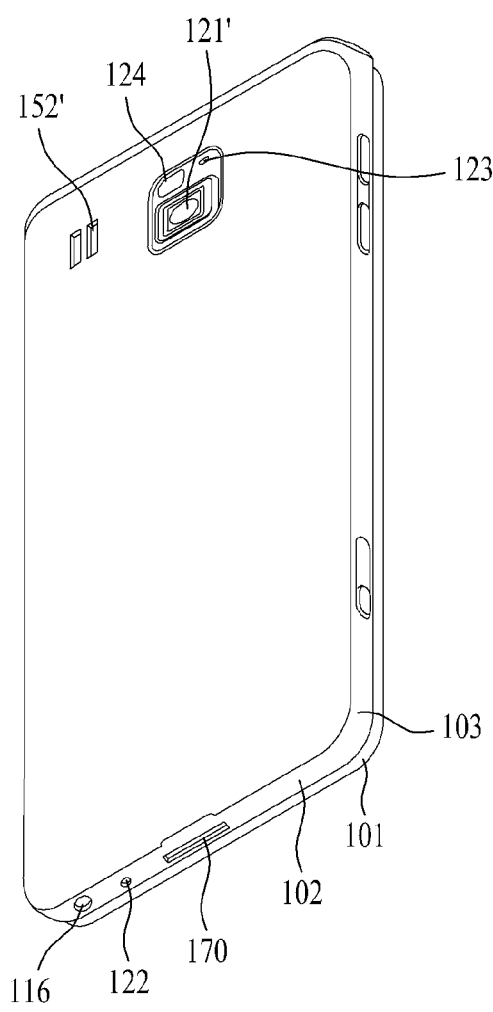
FIG. 3 is a rear perspective diagram of a mobile terminal according to one embodiment of the present invention.

Referring to FIGS. 2 and 3, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case 103 can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131, 132 and 133, a microphone 122, an interface 170 and the like can be provided to the terminal body, and more particularly, to the front case 101.

The display unit 151 occupies most of a main face of the front case 101. The audio output unit 152 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad for detecting a touch can be additionally provided to the rear case 102. The touchpad 135 can be configured in a light transmittive type like the display unit 151. In this instance, if the display unit 151 is configured to output visual information from its both faces, it can recognize the visual information via the touchpad 135 as well. The information output from both of the faces can be entirely controlled by the touchpad. Alternatively, a display is further provided to the touchpad so that a touchscreen can be provided to the rear case 102 as well.

The touchpad is activated by interconnecting with the display unit 151 of the front case 101. The touchpad can be provided in rear of the display unit 151 in parallel. The touchpad can have a size equal to or smaller than that of the display unit 151.

In the following description, a configuration of a broadcasting terminal 200 according to the present invention is explained in detail.

Figure 4:
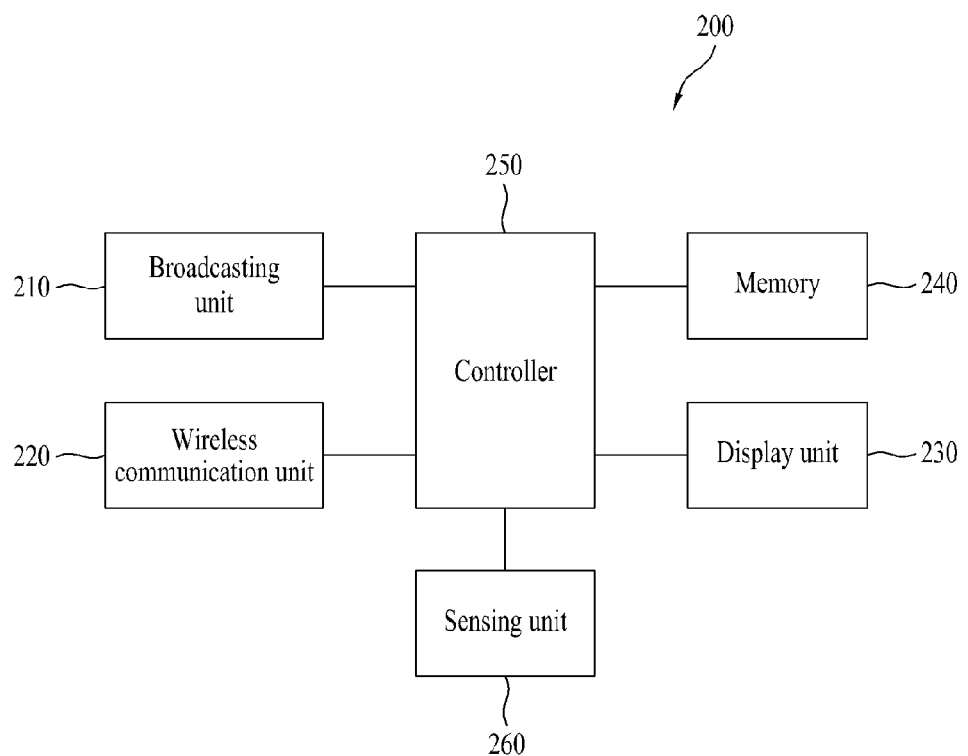
FIG. 4 is a block diagram of a broadcasting terminal according to one embodiment of the present invention.

FIG. 4 is a block diagram of a broadcasting terminal according to one embodiment of the present invention.

Referring to FIG. 4, a broadcasting terminal 200 according to one embodiment of the present invention includes a broadcast receiving unit 210, a wireless communication unit 220, a display unit 230, a memory 240, a controller 250 and the like. Occasionally, the broadcasting terminal 200 may further include a sensing unit 260 configured to measure a spaced distance from the mobile terminal 100.

Like the broadcast receiving module 111 of the mobile terminal 100, the broadcast receiving unit 210 plays a role in receiving a broadcast signal and/or broadcast related information from an external broadcast managing server via a broadcast channel. In this instance, at least one of the broadcast signal and the broadcast related information may be received by a wireless system or a wired system using a cable.

The wireless communication unit 220 is configured to control a communication to be performed between the mobile terminal 100 and the broadcasting terminal 200. In particular, the broadcasting terminal 200 can perform wireless communication with the mobile terminal 100 via the wireless communication unit 220. The wireless communication unit 220 can perform a data communication with the mobile terminal 100 using at least one of a wireless internet technology (e.g., Wi-Fi, Wi-Fi Direct, Wibro, Wimax, HSDPA, GSM, CDMA, WCDMA, LTE, etc.) and a short range communication technology (e.g., Bluetooth, RFID (Radio Frequency Identification), IrDA (infrared Data Association), UWB (Ultra Wideband), Zigbee, etc.).

If the mobile terminal 100 is detected, the controller 250 authenticates the mobile terminal 100 and may then control a personal setting screen, which corresponds to the authenticated mobile terminal 100, to be displayed on the display unit 230.

The broadcasting terminal 200 shown in FIG. 4 may include such a terminal, which is capable of receiving a broadcast signal and/or broadcast related information from an external broadcast managing server, as a TV (e.g., a digital TV, a smart TV, etc.), a desktop, a laptop, a notebook computer and the like. For clarity of the following description, the broadcasting terminal 200 shall be represented as a TV in the following drawings.

In the following description, operations of the mobile terminal 100 and the broadcasting terminal 200 according to the present invention are explained in detail based on the contents shown in FIGS. 1 to 4. For clarity of the following description, a prefix 'first' shall be attached to a configuration of the mobile terminal 100 and a prefix 'second' shall be attached to a configuration of the broadcasting terminal 100. In addition, assume that a first display unit of the mobile terminal 100 includes a touchscreen.

Figure 5:
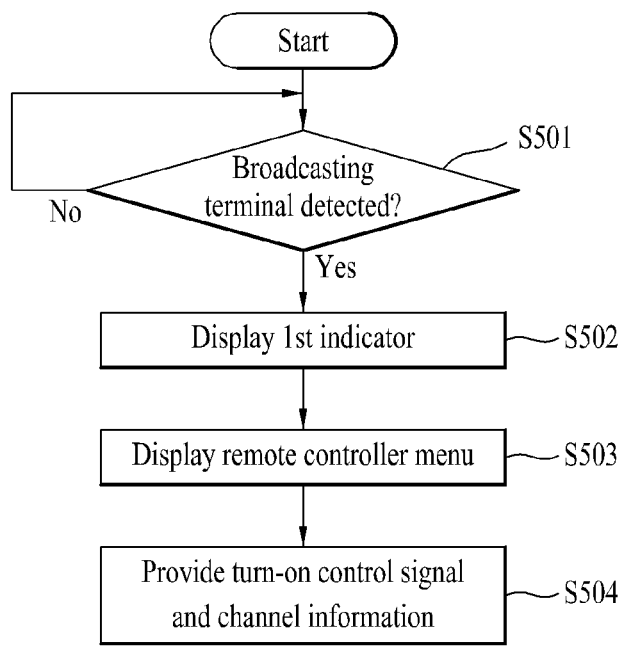
FIG. 5 is a flowchart of a process for operating a mobile terminal according to one embodiment of the present invention.

FIG. 5 is a flowchart of a process for operating a mobile terminal according to one embodiment of the present invention. Prior to the following description with reference to FIG. 5, first of all, assume that channel information and additional data are saved in a first memory 160. In particular, the channel information may include at least one of a preferred broadcast channel and a recently watched broadcast channel.

The preferred broadcast channel may include a broadcast channel previously set by a user or a broadcast channel automatically set by the first controller 180 by analyzing a broadcast channel watching pattern of a user.

When the preferred broadcast channel is automatically set by the first controller 180, the first controller 180 analyzes a broadcast channel watched history and can then designate a broadcast channel, which is determined as watched for a longest time in a prescribed period by a user or which is most frequently visited by a user, to the preferred broadcast channel. In doing so, the broadcast channel watched history may be cumulated by receiving a switched channel information from the broadcasting terminal 200 each time a channel of the broadcasting terminal 200 is switched. Alternatively, the broadcast channel watched history may be cumulated by receiving a switched channel information from the broadcasting terminal 200 each time a user input for switching a channel of the broadcasting terminal 200 is input via a remote controller menu mentioned in the following description.

When a preferred broadcast channel is set, it may be unnecessary for a single broadcast channel to be set as the preferred broadcast channel. Alternatively, by a user's setting or the first controller 180, the preferred broadcast channels may be set to a plurality of broadcast channels. When a plurality of the broadcast channels are set as the preferred channels, a plurality of the broadcast channels may be numbered by a user's setting, a watching time or a visit frequency.

The recently watched broadcast channel may include a broadcast channel output before turn-off of the broadcasting terminal 200 or a broadcast channel watching-reserved (e.g., waiting queue mentioned in the following description) by the mobile terminal before turn-off of the broadcasting terminal 200.

The first controller 180 analyzes the broadcast channel watched history and can then designate a broadcast channel, which is watched last or determined last to be watched, to the recently watched broadcast channel. For instance, when the broadcasting terminal 200 is turned off, the first controller 180 receives a broadcast channel output last via the broadcasting terminal 200 and can then designate the received broadcast channel to the recently watched broadcast channel.

The additional data may relate to an additional content to be additionally output together with a broadcast signal in the course of outputting the broadcast signal received on a broadcast channel matched to the channel information via the broadcasting terminal 200. In particular, the additional data may include at least one of predetermined data, memo data, image data and location data.

That is, the predetermined data may relate to a personal schedule input by a user and may be input via a schedule management application of the mobile terminal 100. The memo data may include a memo written in the mobile terminal 100 by a user.

The image data may include an image or a video file, which is photographed via the camera 121 of the mobile terminal 100 or received from an external terminal. In addition, the location data may include a geographical location of the mobile terminal 100, which is measured at least one of the position location module 115, the mobile communication module 112 and the wireless internet module 113. Based on the location data, the broadcasting terminal 200 outputs weather information matched to the location of the mobile terminal 100 or may control region-based advertisement to be output.

Based on the above-mentioned assumptions, operations of the mobile terminal 100 according to the present invention are described in detail as follows.

Referring to FIG. 5, when the mobile terminal 100 detects the broadcasting terminal 200, the mobile terminal 100 may make a request for an access to the broadcasting terminal 200. In particular, if the mobile terminal 100 determines that the first wireless communication unit 110 belongs to the same network of the broadcasting terminal 200 (e.g., when the mobile terminal 100 and the broadcasting terminal 200 belong to the same AP (access point)) or the mobile terminal 100 receives a broadcast signal for Wi-Fi Direct communication, Bluetooth communication or the like from the broadcasting terminal 200, the mobile terminal 100 can detect the broadcasting terminal 200. Besides, if the broadcasting terminal 200 is determined via the first sensing unit 140 as located in a predetermined distance, the first controller 180 may determine that the broadcasting terminal 200 is detected.

Once the broadcasting terminal 200 is detected, the mobile terminal 100 can request for an access to the broadcasting terminal 200. If the access to the broadcasting terminal 200 is completed through authentication of the broadcasting terminal 200, the first controller 180 can control a first indicator to be displayed on the first touchscreen 151 (S502). A process for displaying the first indicator on the first touchscreen 151 shall refer to the diagram shown in FIG. 6.

Figure 6:
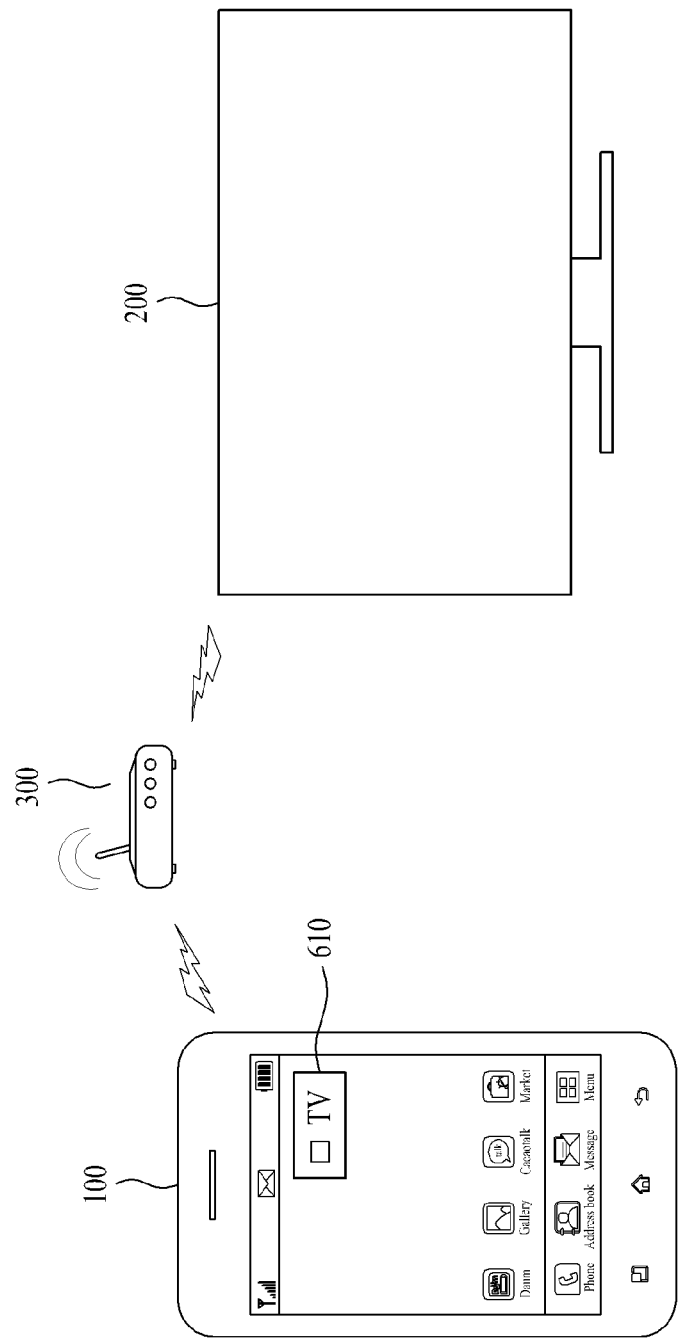
FIG. 6 is a diagram for one example of displaying a first indicator on a first touchscreen.

FIG. 6 is a diagram for one example of displaying a first indicator on a first touchscreen.

Referring to FIG. 6, when the mobile terminal 100 and the broadcasting terminal 200 belong to the same network (e.g., in FIG. 6, the mobile terminal 100 and the broadcasting terminal 200 belong to the same AT 300), the first controller 180 may control a first indicator 610 to be displayed on the first touchscreen 151 to indicate that the broadcasting terminal 200 has been accessed.

In this instance, the first indicator 610 may include at least one of an icon (e.g., a TV icon) configured to represent a type of the broadcasting terminal 200 and a text string (e.g., a text 'TV') configured to represent a type of the broadcasting terminal 200 (FIG. 6). Alternatively, unlike the example shown in FIG. 6, the first indicator 610 may be displayed on a state display bar configured to display operating states of the mobile terminal 100.

Thereafter, if a prescribed user input is input, the first controller 180 may control a remote controller menu, which is provided to remotely control an operation of the broadcasting terminal 200, to be displayed on the first display unit 151 (S503). In this instance, the prescribed user input may mean a touch input applied to the first indicator 610, by which the present embodiment is non-limited. Alternatively, while the mobile terminal 100 detects the broadcasting terminal 200, if a prescribed touch input is applied to the first display unit 151 or a physical button of the mobile terminal 100 is pushed, the first controller 180 can control the remote controller menu to be displayed on the first display unit 151.

Figure 7:
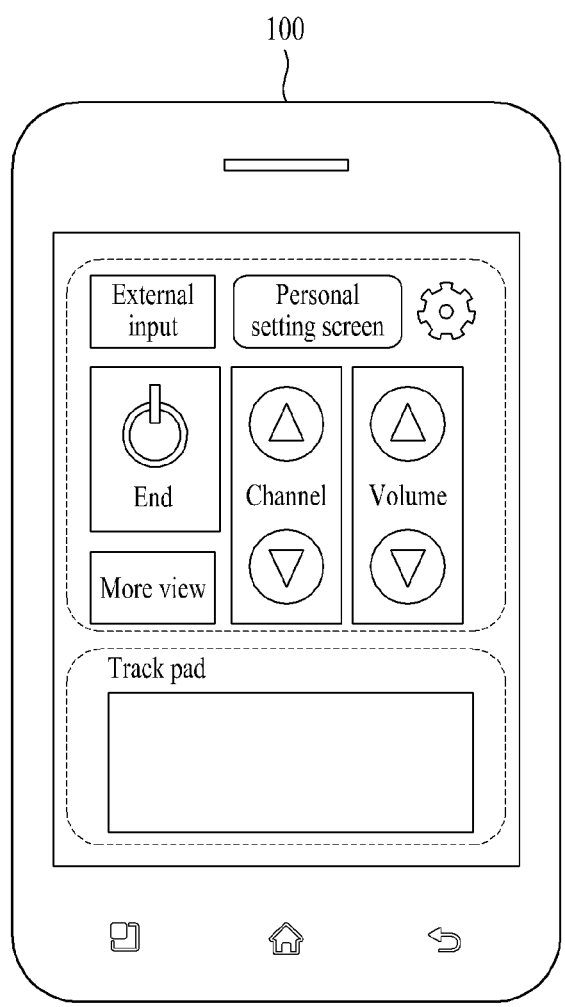
FIG. 7 is a diagram for one example of displaying a remote controller menu on a first display unit.

The remote controller menu is described in detail with reference to FIG. 7 as follows. FIG. 7 is a diagram for one example of displaying a remote controller menu on a first display unit.

Referring to FIG. 7, operation buttons for remotely controlling operations of the broadcasting terminal 200 may be displayed on the remote controller menu. In particular, the remote controller menu may include a power button configured to control the broadcasting terminal 200 to be turned on/off, a channel button configured to switch a broadcast channel of the broadcasting terminal 200, a volume button configured to determine an output volume of the broadcasting terminal 200, an external input button configured to determine whether an image output from an external input device connected to the broadcasting terminal 200 will be output via the broadcasting terminal 200, an additional information button configured to control the broadcasting terminal 200 to display an additional content corresponding to an additional data, and the like.

As a broadcast signal is decoded, while a broadcast content is output via the broadcasting terminal 200, if a touch input is applied to the additional information button, the first controller 180 can transmit additional data to the broadcasting terminal 200 in order for the broadcasting terminal 200 to further display an additional content corresponding to the additional data as well as the broadcast content.

When a broadcast channel of the broadcasting terminal 200 is adjusted using a channel button of the remote controller menu shown in FIG. 7, the first controller 180 can control the broadcasting terminal 200 to adjust a broadcast channel belonging to the preferred broadcast channels of the mobile terminal 100.

For instance, assuming that the preferred broadcast channels are set to channel 6 and channel 8 and that the channel 6 is currently output via the broadcasting terminal 200, if a channel-up button is selected, the first controller 200 can control the broadcasting terminal 200 to be tuned not to channel 7 but to the channel 8 which is the preferred broadcast channel next to the channel 6.

In order for the broadcasting terminal 200 to be tuned to the preferred broadcast channel, the first controller 200 may control the broadcasting terminal 200 to be previously provided with information on the preferred broadcast channels or may control the broadcasting terminal 200 to be provided with information on a broadcast channel, which is supposed to be output by the broadcasting terminal 200, in case of channel manipulation using the remote controller menu.

A track pad may be further included in the remote controller menu. In particular, the track pad is configured to manipulate a cursor displayed on the broadcasting terminal 200. If a touch input having a prescribed trace is input to the track pad, the first controller 180 can control the cursor, which is displayed on the broadcasting terminal 200, to move along the prescribed trace.

If the cursor displayed on the broadcasting terminal 200 is set to move along a motion of the mobile terminal 100, a region of the track pad shown in FIG. 7 may not be displayed. In this instance, the first controller 180 can control a motion of the cursor to be adjusted by providing motion information on the mobile terminal 100 to the broadcasting terminal 200.

The remote controller menu shown in FIG. 7 is just one example for clarity of the description, by which the present invention is non-limited. The mobile terminal 100 according to the present invention may partially include the operation buttons provided by the remote controller menu shown in FIG. 7 or may further include operation buttons configured to perform functions other than the former operation buttons shown in FIG. 7.

For instance, the remote controller menu may further include such an operation button as an EPG information output button, a recording button, a recording reservation button or a virtual keypad configured to input a text string to the broadcasting terminal 200.

Referring again to FIG. 5, regarding the operations of the mobile terminal 100 according to the present invention, while the remote controller menu is being displayed, if a prescribed user input is applied to the mobile terminal 100, the first controller 180 can provide the broadcasting terminal 200 with a turn-on control signal for turning on the broadcasting terminal 200 and a channel information saved in the first memory 160.

In this instance, the prescribed user input may include a touch input applied to the power button of the remote controller menu. As mentioned in the foregoing description of the example, the channel information may include the preferred broadcast channel or the recently watched broadcast channel. When a plurality of broadcast channels are set as the preferred broadcast channels, the channel information provided to the broadcasting terminal 200 may include the broadcast channel most preferred by a user among a plurality of the preferred broadcast channels.

Having received the control information and the channel information from the mobile terminal 100, the broadcasting terminal 200 enters a turned-on state from a turned-off state, receives a broadcast signal on a broadcast channel matched to the channel information, decodes the received broadcast signal, and then outputs a broadcast content.

In particular, if the broadcasting terminal 200 enters the turned-on state, the broadcasting terminal 200 can control a broadcast channel initially designated by the mobile terminal 100 to be output. In the following description, a process for the broadcasting terminal 200 to output channel information initially designated by the mobile terminal 100 is explained in detail with reference to the example shown in FIG. 8.

Figure 8B:
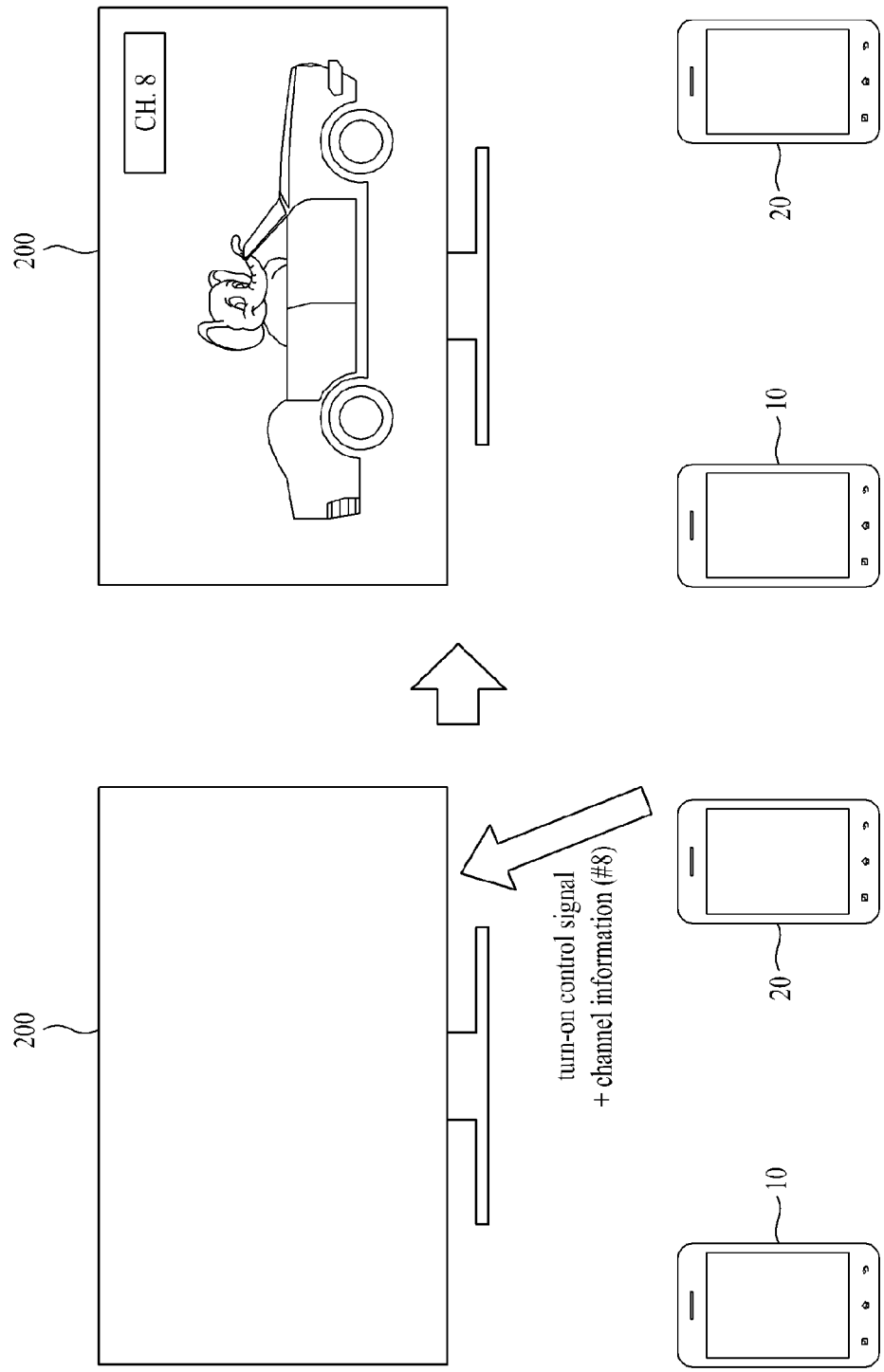

FIGS. 8A and 8B are diagrams illustrating examples of a broadcasting terminal outputting a channel coinciding with channel information. For clarity, a pair of mobile terminals 10 and 20 is called a first mobile terminal 10 and a second mobile terminal 20, respectively. Moreover, assume that a channel information of the first mobile terminal 10 and a channel information of the second mobile terminal 20 are set to #6 and #8, respectively.

Referring to FIG. 8A, if the broadcasting terminal 200 is turned on by the first mobile terminal 10, the broadcasting terminal 200 receives a broadcast signal on channel #6 designated by the first mobile terminal 10, decodes the broadcast signal received on the channel #6, and then outputs the decoded signal, for example.

On the other hand, referring to FIG. 8B, if the broadcasting terminal 200 is turned on by the second mobile terminal 20, the broadcasting terminal 200 receives a broadcast signal on channel #8 designated by the second mobile terminal 20, decodes the broadcast signal received on the channel #8, and then outputs the decoded signal, for example.

In particular, for the examples shown in FIGS. 8A and 8B, the broadcasting terminal 200 can control a broadcast content, which is received on a channel matched to the channel information initially received from the mobile terminal 100, to be output. Therefore, when the broadcasting terminal 200 is turned on, a user of the mobile terminal 100 can control a channel, which is suitable for the taste of the user, to be output.

According to another embodiment of the present invention, the first controller 180 may control additional data to be further provided to the broadcasting terminal 200 together with a turn-on control signal and channel information. When the additional information is provided to the broadcasting terminal 200 together with the control signal and the channel information, a content received on a broadcast channel matched to the channel information and a content matched to the additional information can be simultaneously displayed on the broadcasting terminal 200.

A process for simultaneously displaying a broadcast content received on a broadcast channel matched to channel information and an additional content matched to additional data is described with reference to FIG. 9 as follows.

Figure 9:
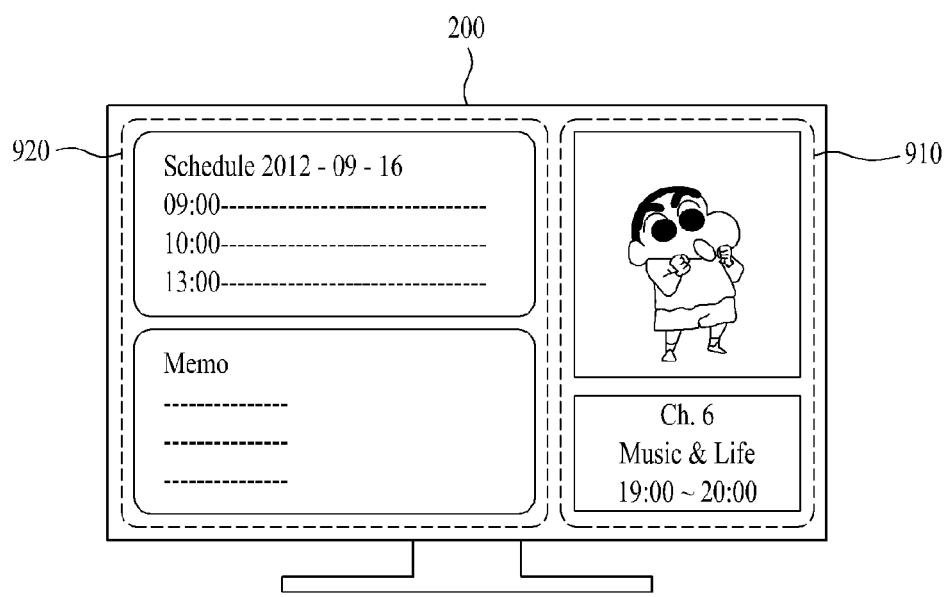
FIG. 9 is a diagram for one example of outputting both a broadcast content and additional data simultaneously via a broadcasting terminal.

FIG. 9 is a diagram for one example of outputting both a broadcast content and an additional content simultaneously via a broadcasting terminal. For clarity, assume that additional data provided to the broadcasting terminal 200 by the mobile terminal 100 include schedule data and memo data.

Referring to FIG. 9, the broadcasting terminal 200 receives channel information and additional data from the mobile terminal 100. The broadcasting terminal 200 may control a broadcast content received on a broadcast channel matched to the channel information to be output to a first region 910 of the second display unit 230 and may control an additional content matched to the additional data to be displayed on a second region 920 of the second display unit 230.

In this instance, the additional content may include a content generated from outputting the received additional data exactly or a content processed using the additional data. In particular, the broadcasting terminal 200 can display a weather, a location based advertisement or the like, which is matched to a location of the mobile terminal 100, as the additional content using the location information of the mobile terminal 100, which is received as the additional data.

The first region 910 and the second region 920 of the second display unit 230 may be automatically determined by the second controller 250 of the broadcasting terminal 200. Alternatively, the first region 910 and the second region 920 of the second display unit 230 may be manually determined by a user of the mobile terminal 100.

When the first region 910 and the second region 920 of the second display unit 230 are manually determined by a user of the mobile terminal 100, the first controller 180 can control the broadcasting terminal 200 to be provided with a layout including information on arranged positions of the first and second regions 910 and 920 together with the additional data.

Figure 10A:
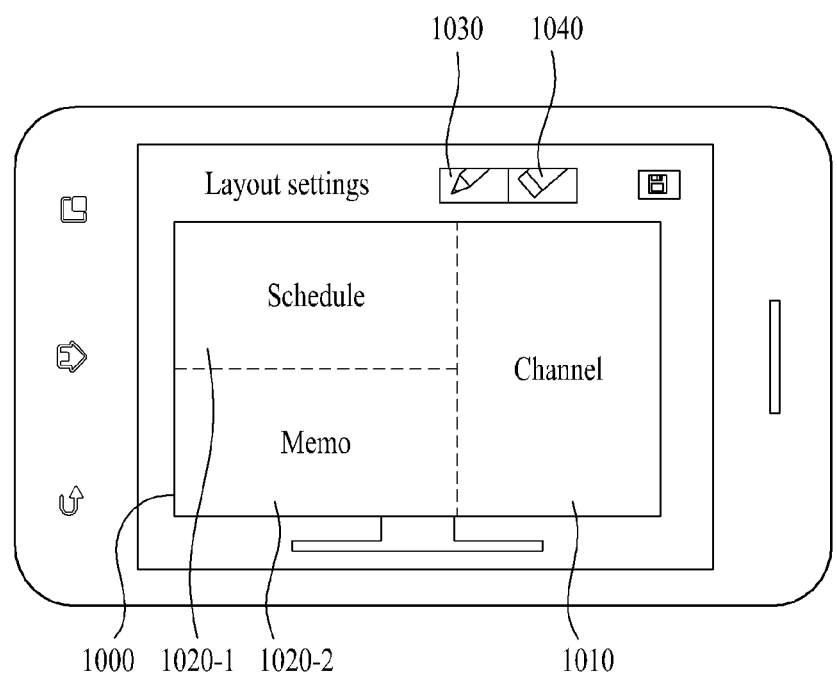
FIGS. 10A to 10C are diagrams for one example of applying a layout set via a mobile terminal to a broadcasting terminal.
Figure 10B:
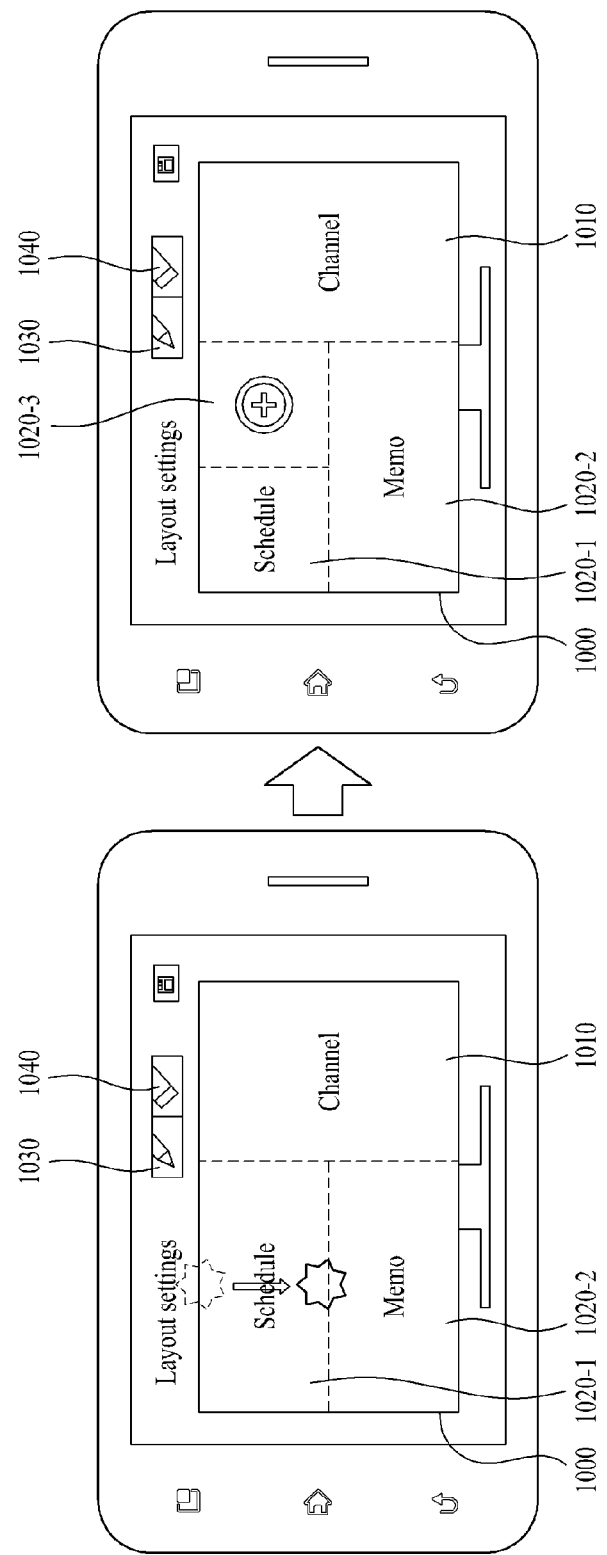
Figure 10C:
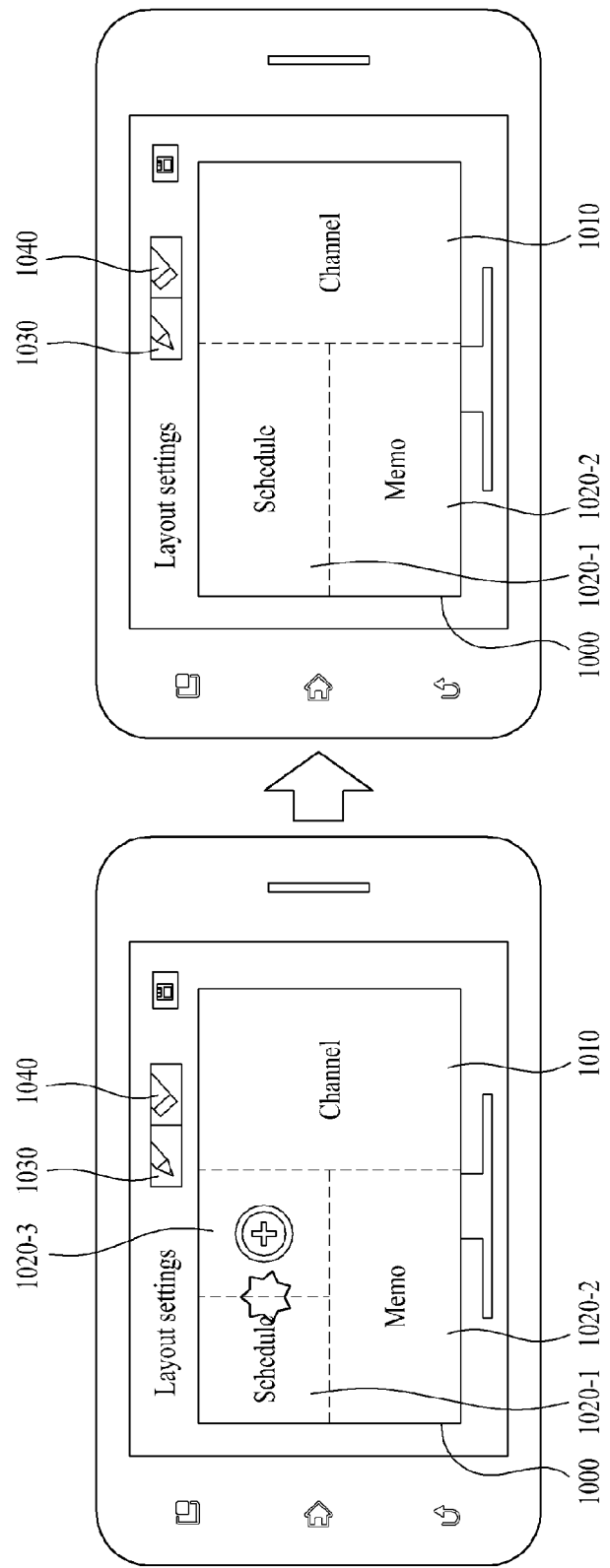

A process for setting a layout via the mobile terminal 100 and a process for applying the set layout to the broadcasting terminal 200 are described in detail with reference to FIGS. 10A to 10C as follows. FIGS. 10A to 10C are diagrams for one example of applying a layout set via a mobile terminal to a broadcasting terminal.

Referring to FIG. 10A, the first controller 180 may control a layout setting screen, which is capable of changing arrangements of first and second regions 1010 and 1020 within a virtual TV region 1000, to be displayed.

The second region 1020 for displaying additional data may be further partitioned into a plurality of subregions in accordance with the number of contents to be displayed. For instance, The second region 1020 shown in FIG. 10A is partitioned into a first subregion 1020-1 and a second subregion 1020-2 and schedule data and memo data may be assigned to the first subregion 1020-1 and the second subregion 1020-2, respectively.

A user can adjust sizes of the first and second regions 1010 and 1020 via the layout setting screen shown in FIG. 10A or can adjust the number of subregions of the second region 1020 and additional data to assign to the subregions via the layout setting screen shown in FIG. 10A.

For instance, while a drawing button 1030 is selected, if a touch input (e.g., a drag to the second point from the first point, etc.) including a touch to a first point within the second region 1020 and a touch to a second point within the second region 1020 is input, the first controller 180 can control a subregion to be added via an imaginary line for connecting the first point and the second point to each other.

In particular, referring to FIG. 10B, if a touch input for partitioning the first subregion 1020-1 into two subregions, the first controller 180 partitions the first subregion 1020-1 to control a $3^{rd}$ subregion 1020-3 to be newly created. Thereafter, the user can select additional data to assign to the newly created $3^{rd}$ subregion 1020-3.

On the other hand, while an eraser button 1040 is selected, if a touch input for selecting a boundary line for partitioning subregions within the second region 1020 is input, the controller 180 may control at least two subregions to merge into one. For instance, referring to FIG. 10C, if a touch input is input to a boundary line for partitioning the first subregion 1020-1 and the $3^{rd}$ subregion 1020-3, the first controller 180 may control the first subregion 1020-1 and the $3^{rd}$ subregion 1020-3 to merge intone.

If the arrangements of the first region 1010 and the second region 1020 are completed, the first controller 180 may control the set layout to be saved in the first memory 160. Thereafter, in case of attempting to transmit additional data to the broadcasting terminal 200, the first controller 180 may control the layout saved in the first memory 160 to be transmitted to the broadcasting terminal 200 together with the additional data. Based on the layout received from the mobile terminal 100, the broadcasting terminal 200 can arrange the first region 1010 and the second region 1020.

When a plurality of layouts have been saved in the first memory 160, the first controller 180 can transmit a defaulted one of a plurality of the layouts to the broadcasting terminal 200 or may control a layout list to be displayed prior to transmitting the layout in order to enable a user to select one of a plurality of the layouts.

A process for displaying the layout list on the first touchscreen 151 is described with reference to FIG. 11 as follows.

Figure 11:
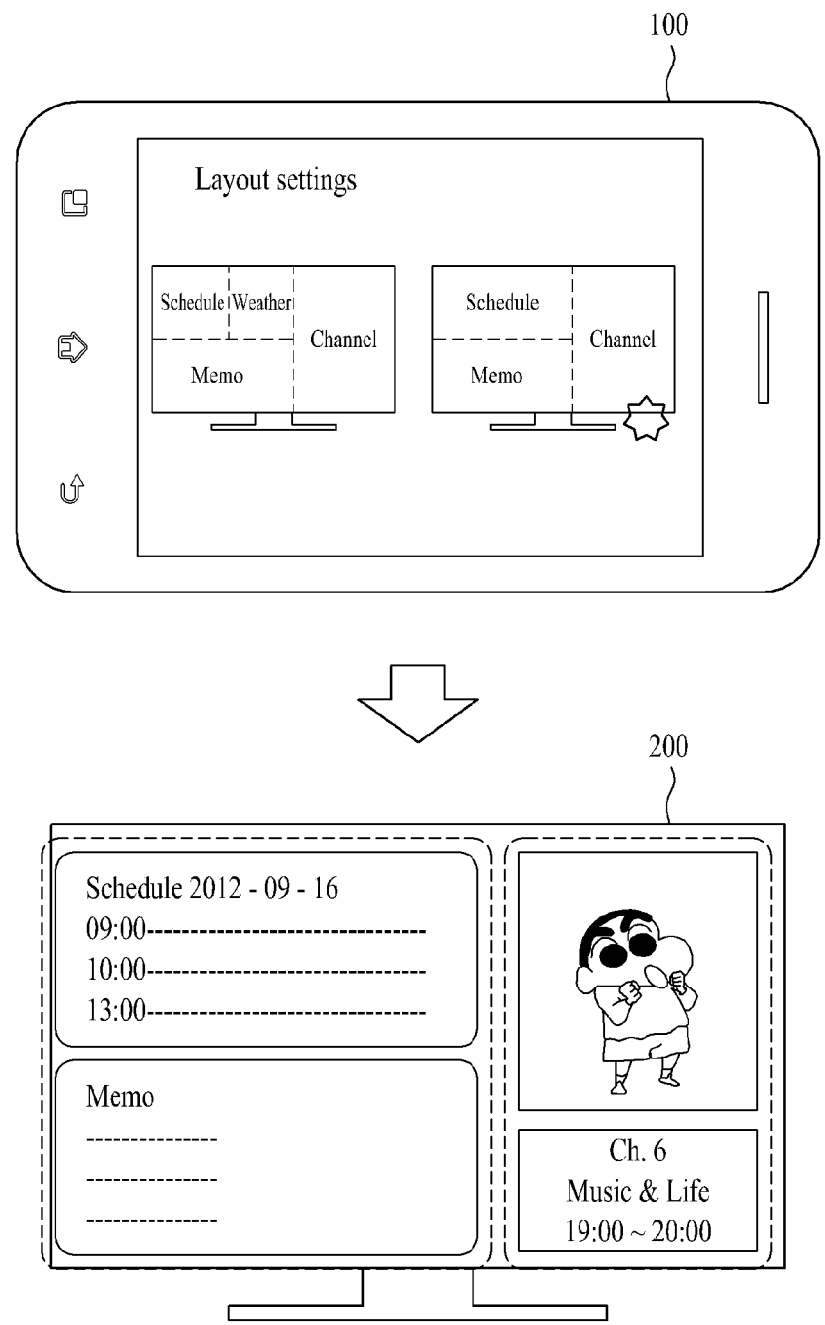
FIG. 11 is a diagram for one example of providing a broadcasting terminal with a layout selected by a user from a plurality of layouts.

FIG. 11 is a diagram for one example of providing a broadcasting terminal with a layout selected by a user from a plurality of layouts.

Referring to FIG. 11, when a plurality of layouts are saved in the first memory 160, the first controller 180 may control a layout list to be displayed. If one of the layouts is selected from the layout list shown in FIG. 11, the first controller 180 may control the selected layout to be provided to the broadcasting terminal 200. Therefore, the broadcasting terminal 200 arranges the first region and the second region in response to the layout selected by a user and may control a broadcast content and an additional data (e.g., schedule data and memo data in FIG. 11) to be output.

The first indicator displaying step S502 shown in FIG. 5 can be skipped in the present invention. In FIG. 5, after the remote controller menu has been displayed (S503), if a prescribed user input is applied to the remote controller menu, the turn-on control signal and the channel information are transmitted to the broadcasting terminal 200 (S504).

Unlike the example shown in FIG. 5, the step of displaying the remote controller menu and the step of transmitting the turn-on control signal and the channel information may be executed in parallel with each other. For instance, after the mobile terminal 100 has detected the broadcasting terminal 200, if a prescribed user input for outputting the remove controller menu is applied, the first controller 180 controls the remote controller menu to be output via the first touchscreen 151 and may also control the turn-on control signal and the channel information to be transmitted to the broadcasting terminal 200.

If the remote controller menu is output, it may mean that there is an intention to watch the broadcasting terminal 200. Hence, when the remote controller menu is output, it may control the broadcasting terminal 200 to perform a turn-on operation immediately.

When the turn-on control signal and the channel information (and additional data) are transmitted to the broadcasting terminal 200, the first controller 180 may control both of the turn-on control signal and the channel information (and additional data) to be simultaneously provided to the broadcasting terminal 200. Alternatively, after the turn-on control signal has been preferentially provided to the broadcasting terminal 200, if the broadcasting terminal 200 is turned on, the first controller 180 may control the channel information (and additional data) to be provided to the broadcasting terminal 200.

Figure 12:
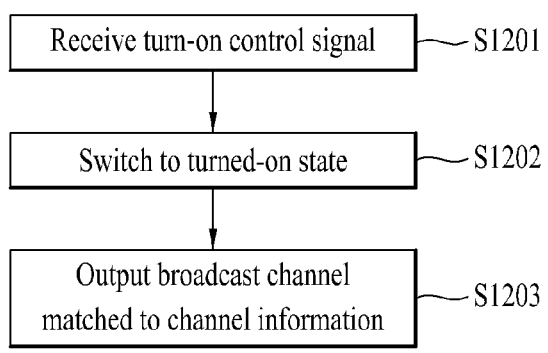
FIG. 12 is a flowchart of a process for operating a broadcasting terminal according to one embodiment of the present invention.

In the following description, an operation of the broadcasting terminal 200 becoming a remote control target of the mobile terminal is explained in detail. FIG. 12 is a flowchart of a process for operating a broadcasting terminal according to one embodiment of the present invention. For clarity, assume that the broadcasting terminal 200 is initially in a turned-off state.

Referring to FIG. 12, if a turn-on control signal is received via the second wireless communication unit 220 (S1201), the broadcasting terminal 200 enters a turned-on state from the turned-off state (S1202). Once the broadcast terminal 200 is turned on, the second controller 250 controls the second broadcast receiving unit 210 to receive a broadcast signal on a broadcast channel matched to channel information received from the mobile terminal 100 and controls a broadcast content to be output by decoding the received broadcast signal (S1203).

When additional data is further received together with the channel information from the mobile terminal 100, the second controller 250 can control a broadcast and an additional data to be output to the first region and the second region of the second display unit 230, respectively. Moreover, if a layout is further received from the mobile terminal 100, the second controller 250 may control sizes and output positions of the first and second regions to be adjusted in accordance with the layout, respectively.

The process for outputting the broadcast data via the broadcasting terminal 200 is already described with reference to FIG. 8 and the process for simultaneously outputting the broadcast content and the additional data is already described with reference to FIG. 9. Thus, the corresponding details of these two processes are omitted from the following description.

In the example shown in FIG. 12, the channel information (and additional data) may be received as well when the turn-on control signal is received (S1201). Alternatively, the channel information (and additional data) may be received from the mobile terminal 100 after the broadcasting terminal 200 has entered the turned-on state.

Prior to receiving the turn-on control signal from the mobile terminal 100, an authenticating step of the mobile terminal 100 may be further included (not shown in the drawing). The authenticating step of the mobile terminal 100 is provided to determine whether an access to the second wireless communication unit 220 will be granted to the mobile terminal 100 through authentication of the mobile terminal 100 or user authentication.

When the mobile terminal 100 requests the access to the second wireless communication unit 220, the second controller 250 can perform the authentication of the mobile terminal 100 or the user authentication based on ID (identification) information of the mobile terminal 100 or user ID information. In this instance, the ID information of the mobile terminal 100 may include at least one of a phone number, IMEI and IMSI of the mobile terminal 100. In addition, the user ID information may include at least one of a user ID and a PIN.

An authentication database for performing the authentication of the mobile terminal 100 or user may be saved in the second memory 240.

Through the authenticating step of the mobile terminal 100, it can block an access made by an unauthorized user of the broadcasting terminal 200. For instance, the mobile terminal 100 keeping a sufficiently close distance from the broadcasting terminal 200 or the mobile terminal 100 belonging to the same AP of the broadcasting terminal 200 is unable to access the broadcasting terminal 200 to provide the turn-on control signal and the channel information to the broadcasting terminal 200 unless authenticated by the broadcasting terminal 200.

In the above description, when the broadcasting terminal 200 is turned on by the remote control of the mobile terminal 100, the operations of the mobile terminal 100 and the broadcasting terminal 200 are explained. In the following description, while the broadcasting terminal 200 is operating in the turned-on state, a linked operation between the mobile terminal 100 and the broadcasting terminal 200 is explained in detail.

<Providing Customized Advertisement Service>

While the mobile terminal 100 and the broadcasting terminal 200 are connected to each other, if a user uses the mobile terminal 100, the second controller 250 of the broadcasting terminal 200 can control a customized advertisement matched to a use pattern of the mobile terminal 100 to be displayed via the second display unit 230.

In particular, the second controller 250 of the present invention receives a use log of the mobile terminal 100 while maintaining a connection between the broadcasting terminal 200 and the mobile terminal and can then control an advertisement data matched to the use log to be displayed via the second display unit 230. Besides, the advertisement data output via the second display unit 230 may be received from an advertisement server via the second wireless communication unit 220.

In this instance, the use log of the mobile terminal 100 may include a log of one of a keyword input by a user via the mobile terminal 100, an item purchased via the mobile terminal 100, a content downloaded via the mobile terminal 100, an advertisement clicked via the mobile terminal 100 and the like. The second controller 250 extracts a user's interest from the use log and can then receive an advertisement data matched to the user's interest from the advertisement server.

Figure 13:
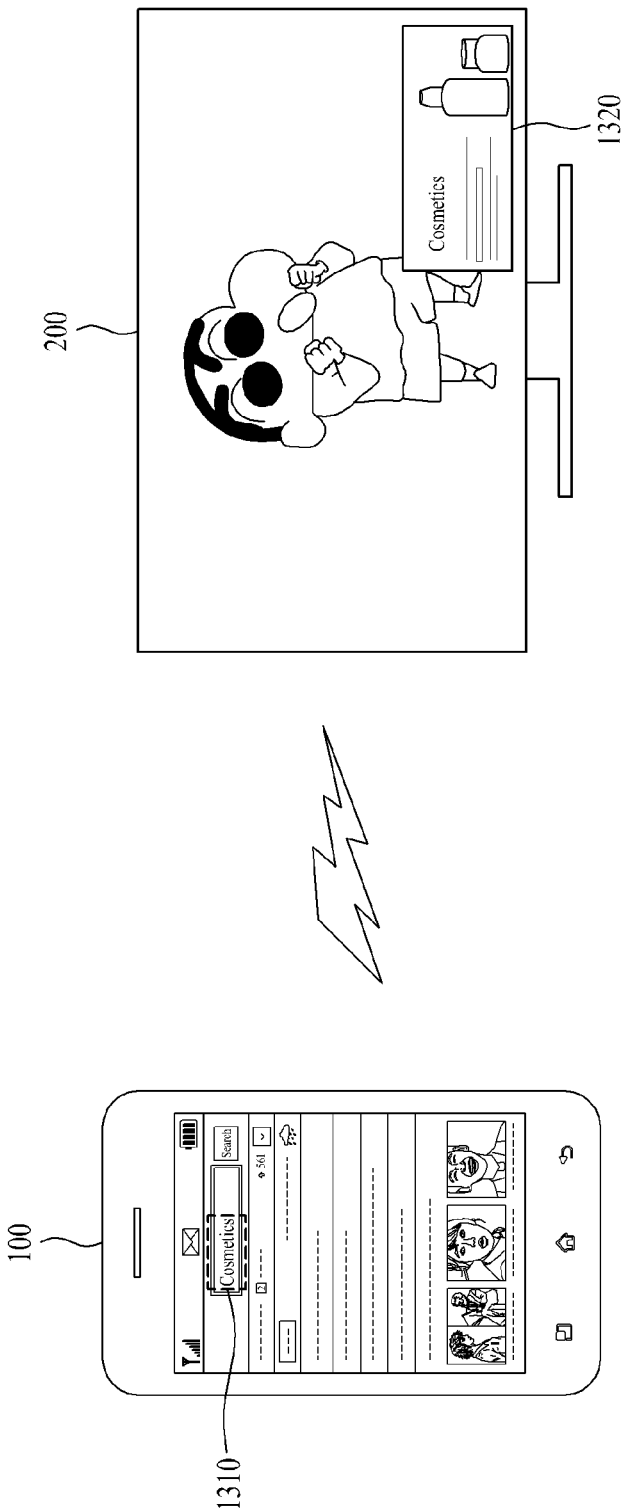
FIG. 13 is a diagram for one example of outputting advertisement data from a broadcasting terminal.

FIG. 13 is a diagram for one example of outputting advertisement data from a broadcasting terminal. For instance, referring to FIG. 13, when a keyword 1310 input via the mobile terminal 100 is 'cosmetics', the second controller 250 receives an advertisement data about cosmetics and can then control the received advertisement data 1320 to be displayed via the second display unit 230. The advertisement data can be a variety of data such as pricing, model name and number, video data, where to buy, a weblink, etc.

In more detail, the advertisement data mentioned in the description of the present invention may relate to one of a specific product, a restaurant, a movie, a music and the like or may include a location based advertisement provided based on a location of the mobile terminal 100.

Figure 14:
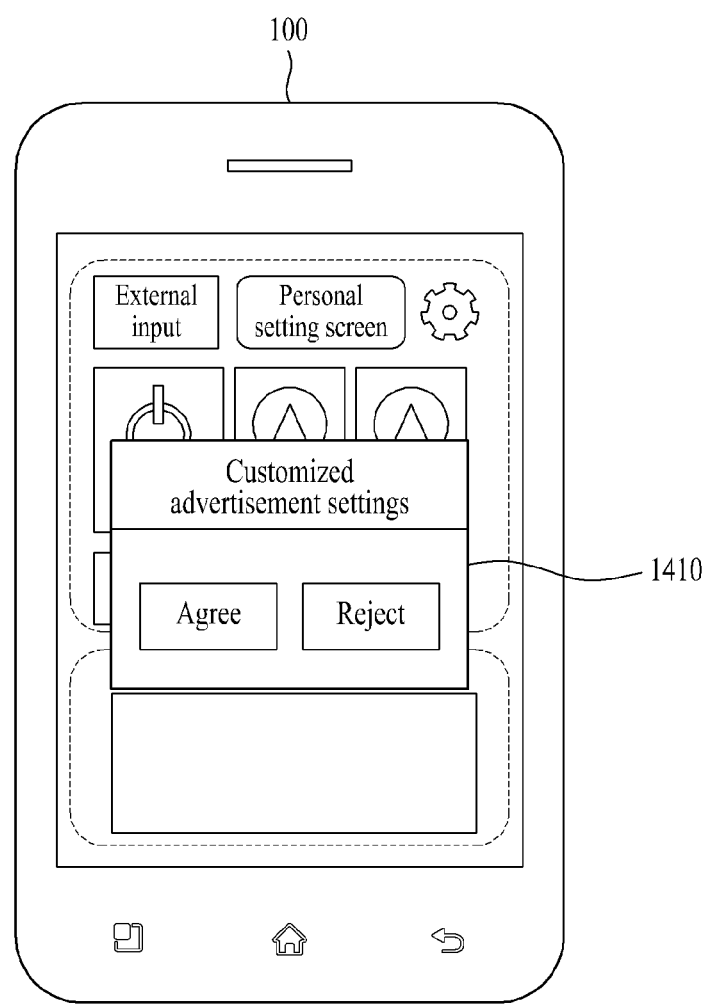
FIG. 14 is a diagram for one example of a setting screen provided to a broadcasting terminal to adjust whether to view a customized advertisement.

Whether the customized advertisement will be displayed via the broadcasting terminal 200 may be adjusted by a user of the mobile terminal 100. FIG. 14 is a diagram illustrating one example of a setting screen provided to a broadcasting terminal to adjust whether to view a customized advertisement. For example, referring to FIG. 14, the first controller 180 of the mobile terminal 100 can determine whether to transmit a use log to the broadcasting terminal 200 based on whether a customized advertisement service is provided or not.

In the example shown in FIG. 14, when a user agrees to the customized advertisement service, the first controller 180 provides the use log to the broadcasting terminal 200 and can then control the customized advertisement to be displayed. On the other hand, if the customized advertisement service is rejected, the first controller 180 may control the customized advertisement not to be displayed by controlling the use log not to be provided to the broadcasting terminal 200.

<Broadcast Related Information Display>

While a broadcast program is being displayed via the broadcasting terminal 200, the first controller 180 of the mobile terminal 100 may control broadcast related information of a broadcast content, which is displayed via the broadcasting terminal 200, to be displayed. For instance, when an output of EPG information is requested via a remote controller menu, the first controller 180 receives broadcast related information, which was received from a broadcast managing server by the broadcasting terminal 200, and can then control the received broadcast related information to be displayed via the first display unit 151.

FIG. 15 is a diagram illustrating one example of outputting a broadcast information via a mobile terminal. Referring to FIG. 15, the broadcasting terminal 200 receives a request signal for broadcast related information from the mobile terminal 100 and can then provide the mobile terminal 100 with the broadcast related information, which is received from a broadcast managing server, to the mobile terminal 100.

For example, as shown in FIG. 15, while a broadcast content is being displayed via the broadcasting terminal 200, the mobile terminal 100 can control the broadcast related information to be displayed via the first display unit 151.

Referring to FIG. 15, the broadcast related information may be displayed on either the first display unit 151 or the second display unit 230. In particular, if the broadcast related information is set to be displayed not on the second display unit 230 but on the first display unit 151, it may be advantageous in checking the broadcast related information without blocking a broadcast content output via the second display unit 230.

The broadcast related information may include at least one of information on a broadcast channel, information on a broadcast program, information on a broadcast service provider, information on a broadcast hour, information on a synopsis of a broadcast program, information on characters of a broadcast program, and the like.

According to another embodiment of the present invention, when the mobile terminal 100 makes a request for a recording reservation to the broadcasting terminal 200, a recording reservation setting menu for setting a recording reservation time may be output not via the second display unit 230 but via the first display unit 151. Like the broadcast related information output via the first display unit 151, this is to prevent a broadcast content output via the second display unit from being blocked.

<Time Machine>

While a broadcast is being displayed via the broadcasting terminal 200, if there occurs an event of expecting that a user can not view a broadcast content in the mobile terminal 100, the broadcasting terminal 200 can provide the mobile terminal 100 with recording data amounting to a period in which the user was unable to view the content via the broadcasting terminal 200.

For instance, while the mobile terminal 100 is connected to the broadcasting terminal 200, as an outgoing signal is received via the mobile terminal 100, if the mobile terminal 100 enters a call mode, the first controller 180 of the mobile terminal 100 can control an event occurrence signal, which indicates that the corresponding broadcast is not viewable, to be transmitted to the broadcasting terminal 200.

Having received the event occurrence signal, the second controller 250 of the broadcasting terminal 200 recognizes a situation that the user of the mobile terminal 100 is not able to view the broadcast content and can then control a recording of the broadcast content to start from a timing point of receiving the event occurrence signal.

Thereafter, if the call in the mobile terminal 100 is ended, the first controller 180 can provide the broadcasting terminal 200 with an even end signal indicating that the call mode is switched to a broadcast viewable mode.

Having received the event end signal, the second controller 250 of the broadcasting terminal 200 ends the recording of the broadcast content and can then provide the recorded broadcast content to the mobile terminal 100.

According to another embodiment of the present invention, the second controller 250 of the broadcasting terminal 200 controls a playback of a broadcast content to pause as soon as the recording of the broadcast content starts from a timing point of receiving an event occurrence signal. Thereafter, the second controller 250 of the broadcasting terminal 200 controls the recorded broadcast content to be output via the second display unit 230 from a timing point of receiving an event end signal, thereby enabling a user to view the broadcast content continuously and seamlessly.

For clarity, the above-described example relates to when the mobile terminal 100 enters the call mode in the event that a broadcast content is not viewable, by which the present invention is non-limited. In another example, the broadcast content non-viewable event may include an email writing application, a text message writing application and the like being activated in the mobile terminal 100.

The above-mentioned embodiment relates to the linkage between a single mobile terminal 100 and a broadcasting terminal 200 while the broadcasting terminal 200 operates in a turned-on state. In the following description, while a broadcasting terminal 200 operates in a turned-on state, the linkage among a broadcast terminal 200 and a plurality of mobile terminals 100 is described as follows.

First of all, when a plurality of the mobile terminals 100 are connected to the broadcasting terminal 200, the second controller 250 of the broadcasting terminal 200 may designate a prescribed one of a plurality of the mobile terminals 100 to an administrator account and may also designate the rest of the mobile terminals 100 to user accounts.

For clarity of the following description, the mobile terminal 100 designated to the administrator account is assumed as a first mobile terminal 10 of a first user and the mobile terminal 100 designated to the user account is assumed as a second mobile terminal 20 of a second user.

A control signal provided by the first mobile terminal 10 to remotely control the broadcasting terminal 200 is called a first control signal, a control signal provided by the second mobile terminal 20 to remotely control the broadcasting terminal 200 is called a second control signal, and each of the first control signal and the second control signal is provided for channel adjustment of the broadcasting terminal 200.

A broadcast content received on a broadcast channel designated by the first control signal is called a first broadcast content and a broadcast content received on a broadcast channel designated by the second control signal is called a second broadcast content.

When the first control signal is received from the first mobile terminal 10, the second controller 250 can control an operation of the broadcasting terminal 200 in response to the first control signal. On the other hand, when the second control signal is received from the second mobile terminal 20, the second controller 250 of the broadcasting terminal 200 may control the second control signal to be applied only if there is an agreement of the first mobile terminal 10.

Alternatively, the second controller 250 of the broadcasting terminal 200 may control a feedback to be output in response to the second control signal. In the following description, an operation of the broadcasting terminal 200 on the basis of the second control signal received from the second mobile terminal 20 designated to the user account is explained in detail.

Figure 16:
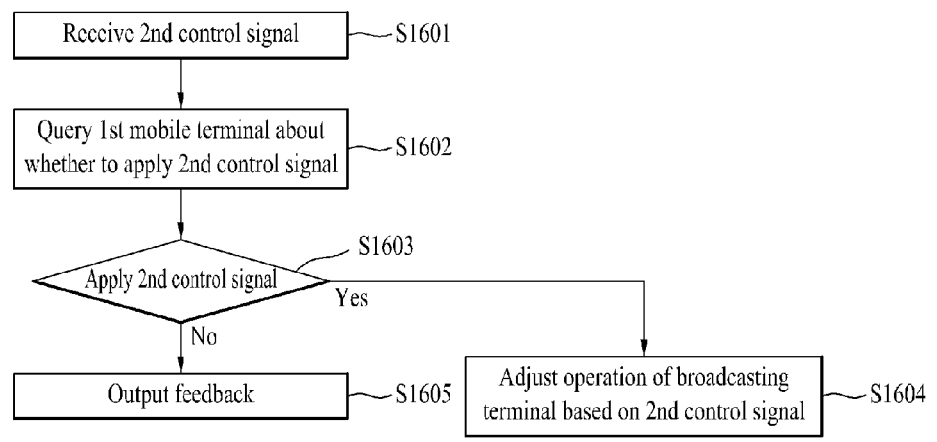
FIG. 16 is a flowchart of a process for operating a broadcasting terminal according to the present invention.

FIG. 16 is a flowchart illustrating a process for operating a broadcasting terminal according to the present invention. Referring to FIG. 16, while the first mobile terminal 10 and the second mobile terminal 20 are connected to the broadcasting terminal 200, if the second control signal is received from the second mobile terminal 20 designated to the user account (S1601), the second controller 250 can transmit a query message, which is to query whether to apply the second control signal, to the first mobile terminal 10 (S1602).

In providing the query message for querying whether to apply the second control signal to the first mobile terminal 10, in order for the first user of the first mobile terminal 10 to recognize a content of the second control signal, the second controller 250 may control a preview image of the second broadcast content received on a broadcast channel designated by the second control signal to be displayed on at least one portion of the second display unit 230 or may control the preview image of the second content received on the broadcast channel designated by the second control signal to be contained in the 1 query message.

Figure 17A:
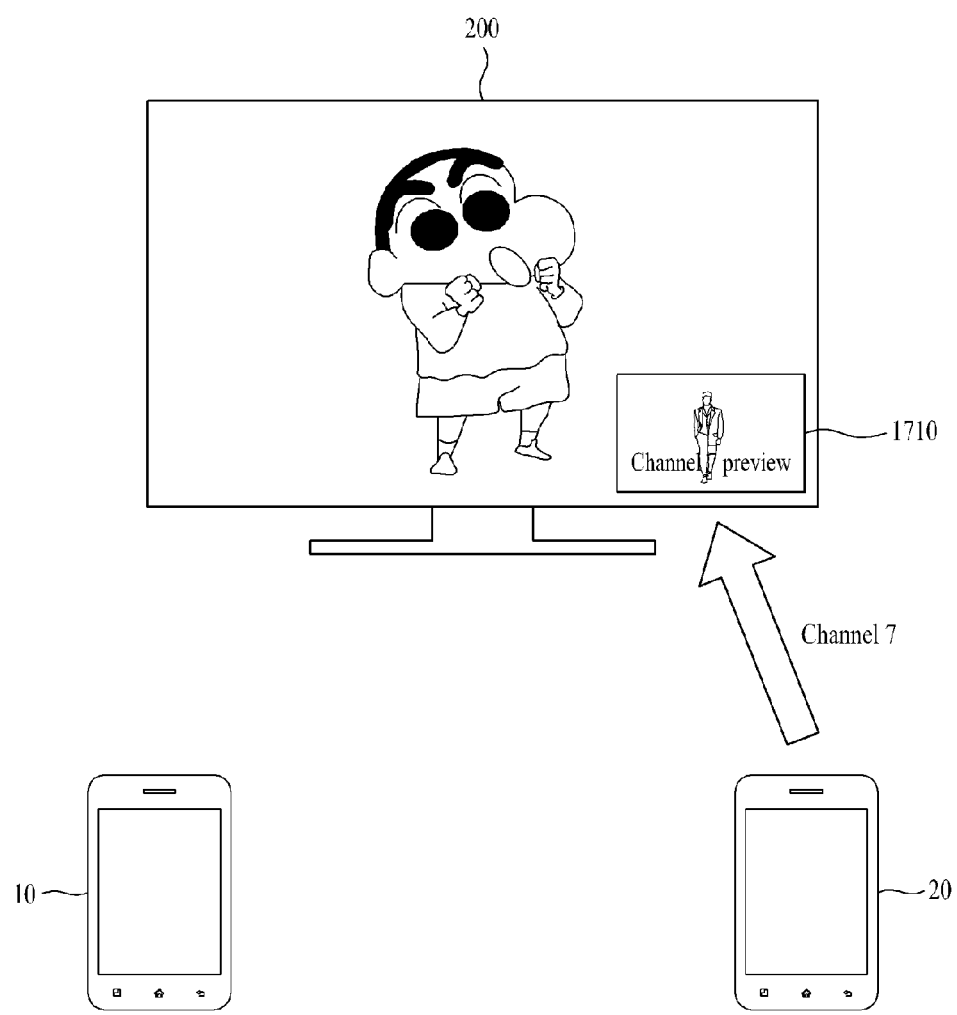
FIG. 17A and FIG. 17B are diagrams for one example of outputting a preview image via a broadcasting terminal and a mobile terminal.

For instance, if the second control signal is provided to switch the broadcast channel to #7 from #6, referring to FIG. 17A, the second controller 250 may control a preview image 1710 of the second broadcast content, which is received on the channel #7, to be output to the second display unit 230. Through this, the user of the first mobile terminal 10 can preview the second broadcast content received on the broadcast channel designated by the second mobile terminal 20.

Figure 17B:
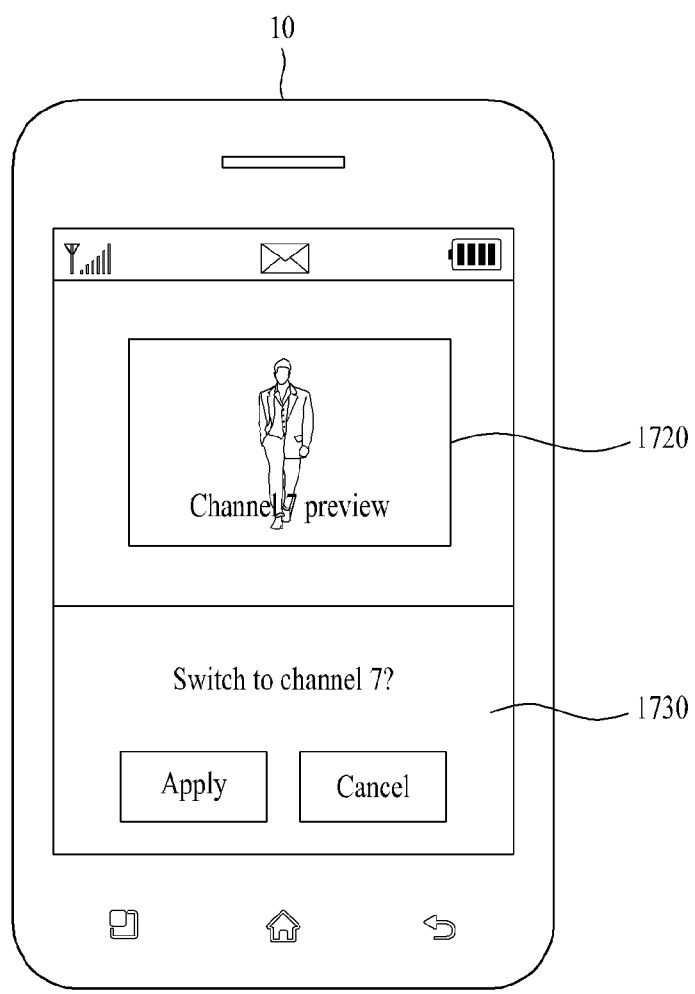

According to another embodiment of the present invention, the second controller 250 provides the first mobile terminal 10 with a query message containing a preview image of the second content and can then control the preview image of the second broadcast content to be output via the first mobile terminal 10. Referring to FIG. 17B, the first mobile terminal 10 receives the preview image of the second broadcast content from the broadcasting terminal 200 and can then control a preview image 1720 contained in the query message to be displayed. Moreover, the first mobile terminal 10 may control a selection menu 1730 to be further displayed to enable the user to determine whether to apply the second control signal.

When receiving a response, which indicates to apply the second control signal, from the first mobile terminal 10 (S1603), the second controller 250 can control an operation of the broadcasting terminal 200 to be adjusted in accordance with the second control signal (S1604). On the contrary, when receiving a response, which indicates not to apply the second control signal, from the first mobile terminal 10 (S1603), the second controller 250 can control a feedback to be output via the second display unit 230 in response to the second control signal while maintaining an output of the first broadcast content (S1605).

In this instance, the feedback output via the second display unit 230 may be performed by outputting a waiting queue list for announcing that the second control signal has been reserved or outputting the second broadcast content to a partial region of the second display unit 230.

Outputting the feedback via the second display unit 230 is described in detail with reference to the accompanying drawing as follows.

Figure 18:
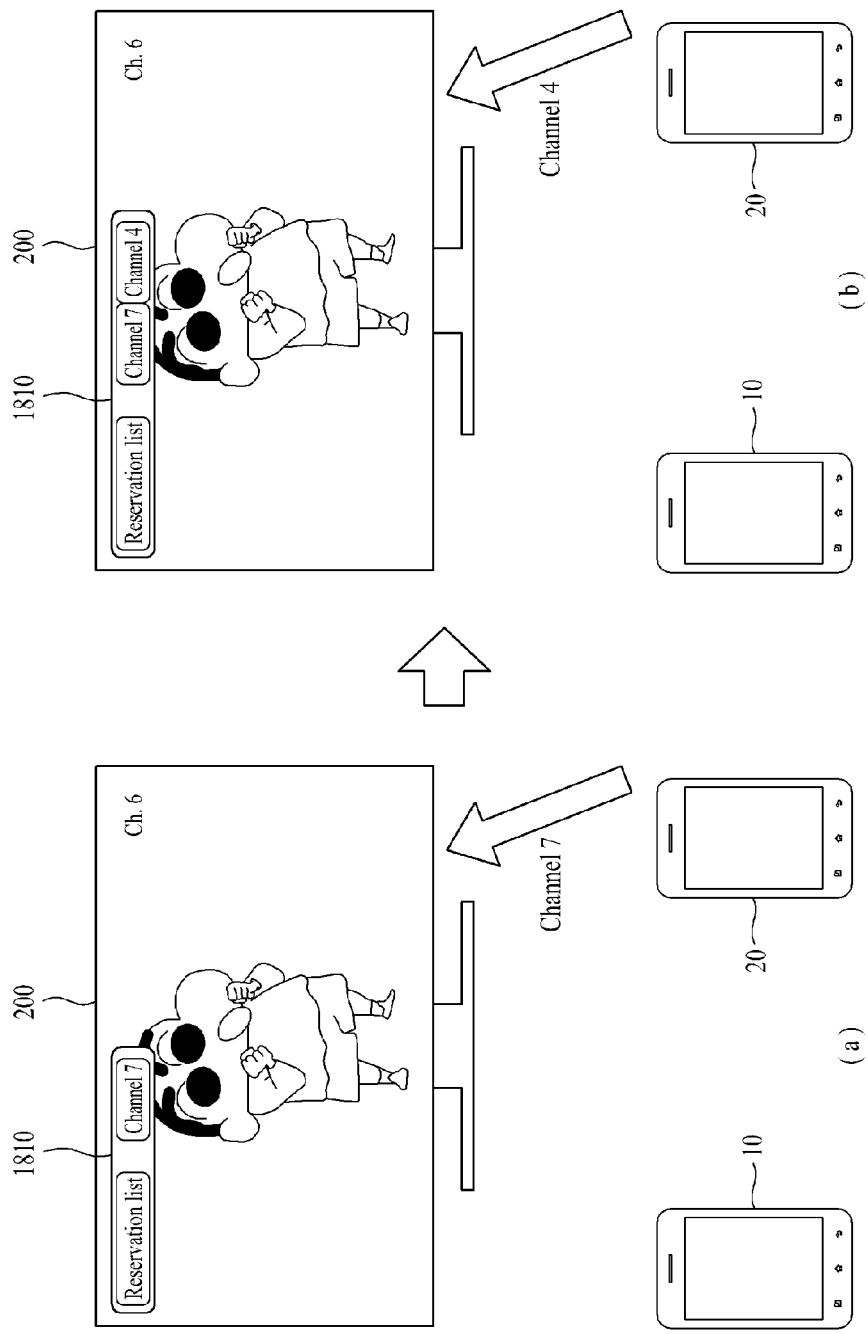
FIG. 18 is a diagram for one example of outputting a waiting queue list to a second display unit.

FIG. 18 is a diagram illustrating one example of outputting a waiting queue list to a second display unit. Referring to FIG. 18, when the second control signal is received from the second mobile terminal 20 designated to the user account, the second controller 250 reserves the second control signal and can then control a waiting queue list, which indicates a reserved operation list, to be displayed via the second display unit 230.

For instance, while the first broadcast content received on the channel #6 is being output via the second display unit 230, if the second control signal for switching the broadcast channel to the channel #7 is input from the second mobile terminal 20, the second controller 250 reserves the second control signal and then outputs a waiting queue list 1810, as shown in FIG. 18(a), to display that the channel #7 has been reserved.

While the second control signal is reserved, if the first control signal is received from the first mobile terminal 10 or the second control signal is further received from the second mobile terminal 20, the second controller 250 can reserve the further received first control signal and/or the second control signal in subordinated order. For instance, in the state shown in FIG. 18(a), if a request for switching to the channel #9 and a request for switching to the channel #4 are received from the second mobile terminal 20, the second controller reserves the channel #9 and the channel #4 and can then control a reservation list added to the waiting queue list 1820, as shown in FIG. 18(b), to be further displayed.

If a prescribed condition occurs, the second controller 250 can control an operation served in the waiting queue list to be executed. In this instance, the prescribed condition may include such a condition as an end of a broadcast content output via the broadcasting terminal 200 (i.e., a case that a broadcast time of a prescribed broadcast program ends), a disconnection between the first mobile terminal designated to the administrator account and the broadcasting terminal 200, a request for switching to the same broadcast channel of reserving the first mobile terminal 10 designated to the administrator account and the like, by which the present embodiment is non-limited.

Referring to FIG. 18B, when a plurality of operations are reserved, the second controller 250 can control the operation of the broadcasting terminal 200 to be adjusted in order of the reservation. However, when the first mobile terminal 10 designated to the administrator account is set to preferentially execute the operation reserved in the subordinated order, the operation of the broadcasting terminal 200 can be adjusted irrespective of the order of the reservation.

Moreover, in displaying waiting queues for representing operations to be reserved in the waiting queue list, the second controller 180 can control the mobile terminal 100, which has input the waiting queue, to be identifiable (not shown in the drawing). In particular, the second controller 250 may control a first color or an identifier related to the first mobile terminal 10 to be given to the waiting queue created by the operation reservation of the first mobile terminal 10 or may control a second color or an identifier related to the second mobile terminal 20 to be given to the waiting queue created by the operation reservation of the second mobile terminal 20. Hence, it can identify which user has input the corresponding waiting queue.

In the following description, explained is a process for outputting the second broadcast content to a partial region of the second display unit 230 in another form of the feedback displayed on the second display unit 230.

Figure 19:
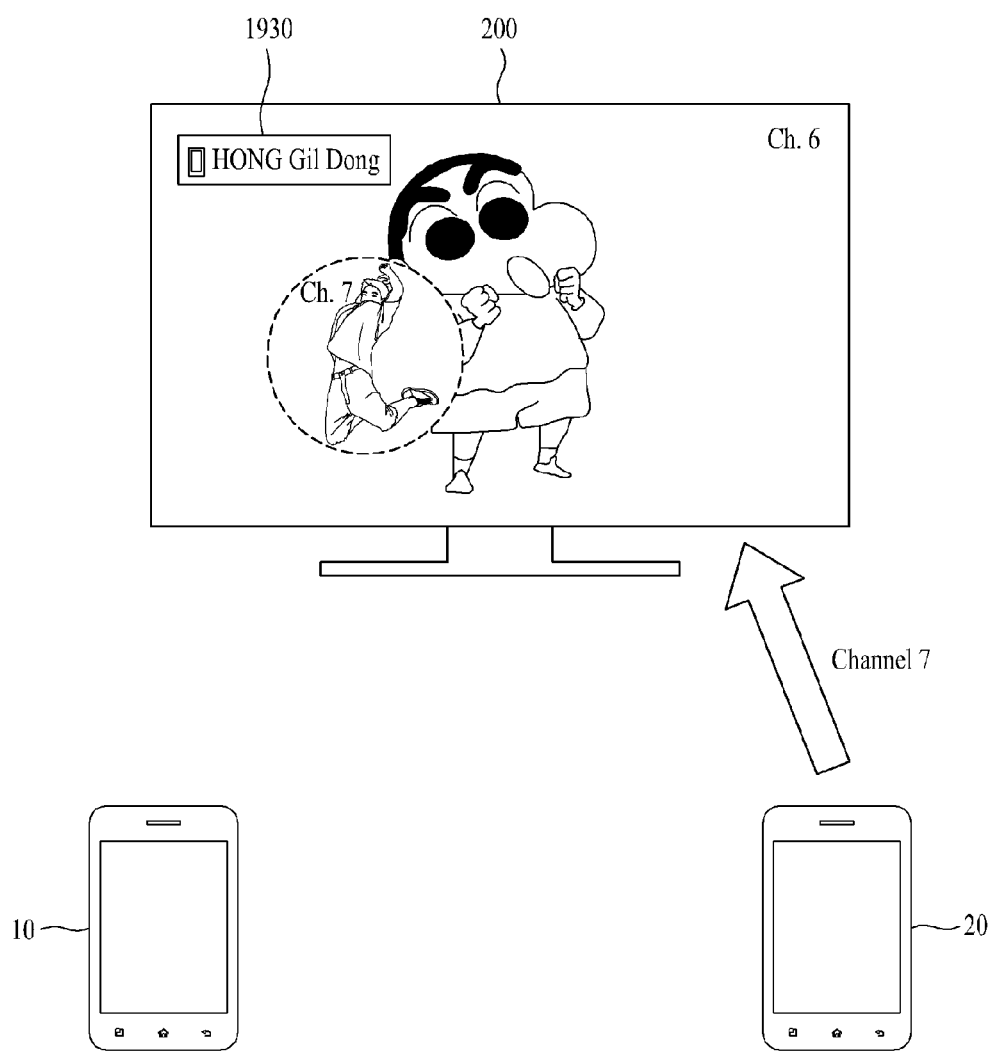
FIG. 19 is a diagram for one example of outputting a second broadcast content to a partial region of a second display unit.

FIG. 19 is a diagram for one example of outputting a second broadcast content to a partial region of a second display unit.

Referring to FIG. 19, in case of receiving the second control signal from the second mobile terminal 20 designated to the user account, the second controller 250 controls the first broadcast content to be continuously output to a first region 1910 of the second display unit 230 and may be also able to control the second broadcast content, which is received on a broadcast channel designated by the second control signal, to be displayed on a second region 1920 of the second display unit 230.

For instance, while the first broadcast content received on the channel #6 is output, if the second control signal for switching to the channel #7 is received from the second mobile terminal 20, the second controller 250 can control the second broadcast content received on the channel #7, as shown in FIG. 19, to be displayed on the second region 1920 of the second display unit 250.

Moreover, when the second control signal is received from the second mobile terminal 20, the 2nc controller 250 may control a second indicator 1930 to be displayed via the second display unit 250 to indicate that the second control signal has been received from the second mobile terminal 20. Hence, using the second indicator 1930, the user of the first mobile terminal 10 and the user of the second mobile terminal 20 can recognize that the second control signal has been input from the second mobile terminal 20.

In the example shown in FIG. 19, since the second region 1920 for displaying the second broadcast content thereon is situated inside the first region 1910, the second broadcast content is output as PIP (picture in picture). However, it may be unnecessary for the second region 1920 to be situated inside the first region 1910, as shown in the example shown in FIG. 19.

Figure 20:
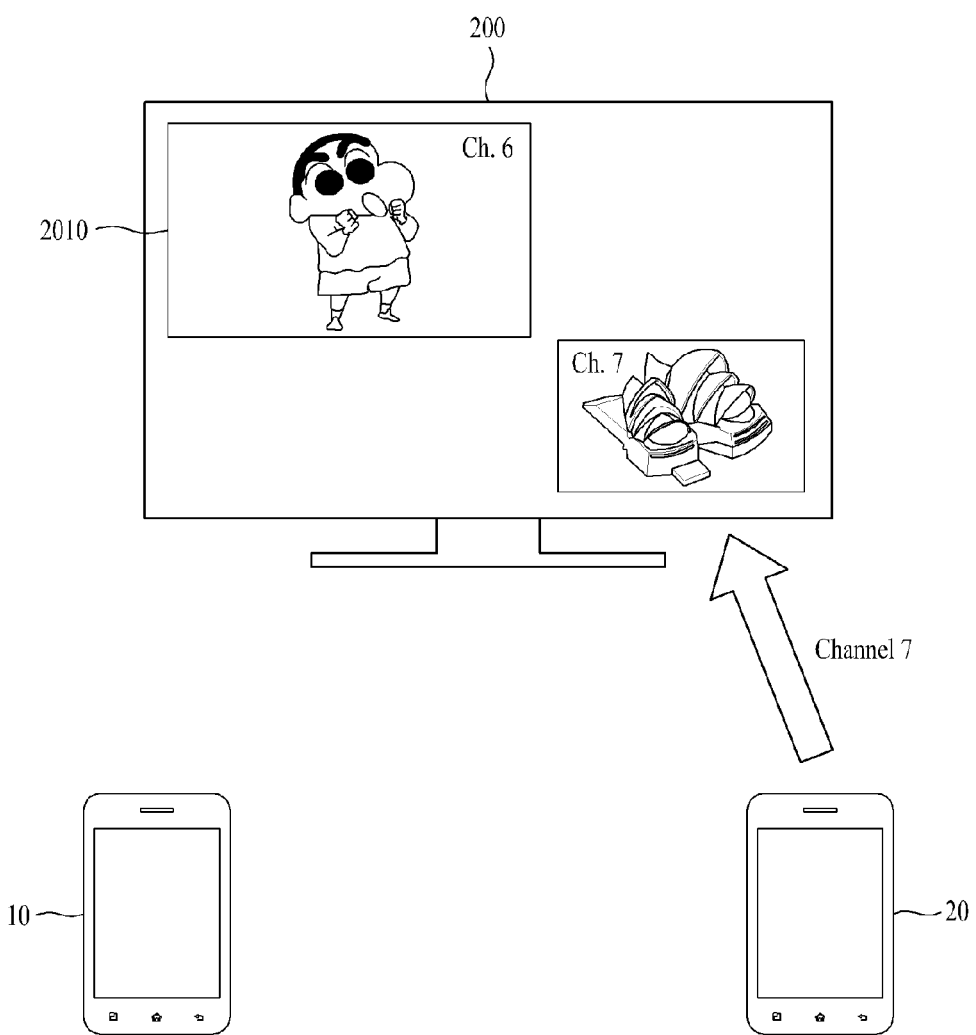
FIG. 20 is a diagram In another example of outputting a second broadcast content to a partial region of a second display unit.

This is described in detail with reference to FIG. 20 as follows. FIG. 20 is a diagram In another example of outputting a second broadcast content to a partial region of a second display unit.

Referring to FIG. 20, the second controller 250 may control a first region 2010 and a second region 201 to be displayed by not overlapping with each other. Therefore, if the first region 2010 and the second region 2020 are displayed by being prevented from overlapping with each other, as shown in the example shown in FIG. 20, it can prevent a first broadcast content and a second broadcast content from blocking each other.

In doing so, a size of the first region 2010 and a size of the second region 2020 may be adjusted in accordance with a spaced extent between the broadcasting terminal 200 and the mobile terminal 100. For instance, if a distance between the broadcasting terminal 200 and the mobile terminal 100 increases, the second controller 250 can control the size of the first region 2010 to increase. If a distance between the broadcasting terminal 200 and the mobile terminal 100 decreases, the second controller 250 can control the size of the first region 2010 to decrease.

On the contrary, in another instance, if a distance between the broadcasting terminal 200 and the mobile terminal 100 increases, the second controller 250 can control the size of the first region 2010 to decrease. If a distance between the broadcasting terminal 200 and the mobile terminal 100 decreases, the second controller 250 can control the size of the first region 2010 to increase.

When the size of the first region 2010 is adjusted in accordance with the spaced extent of the first mobile terminal 10, the size of the second region 2020 can increase or decrease relatively in accordance with the size adjustment of the first region 2010. If the sizes of the first and second regions 2010 and 2020 are adjusted based on the spaced distance from the broadcasting terminal 200, it may be adjusted in accordance with a spaced extent between the second mobile terminal 1090 and the broadcasting terminal 200.

When a control signal is input to the broadcasting terminal 200, the second controller 250 can control a second indicator 2030, which is provided to identify the mobile terminal 100 having input the control signal, to be output via the second display unit 230. In particular, if a first control signal is input from the first mobile terminal 10, the second controller 250 configures and outputs the second indicator 2030 to announce that the first control signal has been input from the first mobile terminal 10.

On the other hand, if a second control signal is input from the second mobile terminal 20, the second controller 250 configures and outputs the second indicator 2030 to announce that the second control signal has been input from the second mobile terminal 20.

Because FIG. 20 shows the second control signal is received from the second mobile terminal 20, the second controller 250 can control the second indicator 2030 to be configured to indicate that the control signal has been input from the second mobile terminal 20. Although FIG. 20 shows the example that the second indicator 2030 contains a user name (e.g., 'HONG Gil Dong' in FIG. 20) of the mobile terminal 100, the second indicator 2030 can further contain at least one portion of a text ring of a phone number of the mobile terminal 100, an ID of the mobile terminal 100 on a network and the like.

Referring to FIGS. 19 and 20, the second controller 250 can control a feedback to be output in response to the second control signal input from the second mobile terminal 20. In the former description with reference to FIG. 16, if the first mobile terminal 10 designated to the administrator account does not agree to applying the second control signal, the feedback is output via the second display unit 230 in response to the second control signal.

Unlike the example shown in FIG. 16, the second controller 250 of the broadcasting terminal 200 may control the feedback to be output via the second display unit 230 irrespective of whether the first mobile terminal 10 has agreed to applying the second control signal. In particular, the broadcasting terminal 200 can operate by skipping the steps S1602 and S1604. In doing so, steps S1602 and may proceed in parallel with each other.

To implement the embodiment shown in FIG. 16, at least one (e.g., the first mobile terminal 10 in FIG. 16) of a plurality of the mobile terminals 100 are preferably designated to the administrator account and the rest (e.g., the second mobile terminal 20 in FIG. 16) of the mobile terminals 100 are preferably designated to the user accounts.

When a plurality of the mobile terminals 100 are connected to the broadcasting terminal 200, the second controller 250 can select the mobile terminal 100 at the administrator account and the mobile terminals 100 at the user account. In the following description, various methods for the second controller 250 to designate a prescribed one of a plurality of mobile terminals 100 to an administrator account and to designate the rest of the mobile terminals 100 to user accounts are explained in detail.

<Discrimination by Connection Priority>

The second controller 250 can set an administrator account and a user account in accordance with order in which a plurality of mobile terminals 100 are connected to the broadcasting terminal 200.

In particular, the second controller 250 may designate the mobile terminal 100 initially connected to the broadcasting terminal 200 to the administrator account and may designate the mobile terminal, which is connected to the broadcasting terminal 200 behind the initially connected mobile terminal 100, to the user account.

<Designating Mobile Terminal Having Turned on Broadcasting Terminal to Administrator Account>

The second controller 250 can designate the mobile terminal 100, which has the broadcasting terminal 200 turned on, to an administrator account irrespective of or in which a plurality of mobile terminals are connected to the broadcasting terminal 200.

In this instance, the mobile terminal 100, which has provided the broadcasting terminal 200 with a control signal for enabling the broadcasting terminal 200 to enter a turned-on state, may be designated to the administrator account and the rest of the mobile terminals 100 except the administrator account may be designated to user accounts.

<Presetting Mobile Terminal at Administrator Account>

Identification information of the mobile terminal 100, which is supposed to be designated to an administrator account, may be saved in the second memory 240 of the broadcasting terminal 200. The second controller 250 compares an identification information of the mobile terminal 100 accessing the broadcasting terminal 200 with the identification information saved in the second memory 240 and can then determine whether to designate the corresponding mobile terminal 100 to the administrator account or a user account.

In this instance, the identification information may include at least one of a phone number, IMSI, IMEI, serial number, user ID and password of the mobile terminal 100.

<Discrimination by Preferred Channel>

The second controller 250 can control a control authority per channel to be changed based on preferred channels of each of a plurality of mobile terminals 100. For instance, when the preferred channels of the first mobile terminal 10 among a plurality of the mobile terminals 100 include a channel A, a channel B and a channel C and the preferred channels of the second mobile terminal 20 among a plurality of the mobile terminals 100 include the channel C, a channel D and a channel E, if one of the channel A and the channel B corresponding to the preferred channels of the first mobile terminal 10 only is displayed via the broadcasting terminal 200, the second controller 250 can designate the first mobile terminal 10 and the second mobile terminal 20 to an administrator account and a user account, respectively.

On the other hand, if one of the channel D and the channel E corresponding to the preferred channels of the second mobile terminal 20 only is displayed via the broadcasting terminal 200, the second controller 250 can designate the second mobile terminal 20 and the first mobile terminal 10 to an administrator account and a user account, respectively.

If a channel (e.g., the channel C) set as the preferred channel by both of the first mobile terminal 10 and the second mobile terminal 20 or a channel not set as the preferred channel by both of the first mobile terminal 10 and the second mobile terminal 20 is displayed, the second controller 250 can set the administrator account by the former discriminating method in accordance with the connection priority or can designate each of both of the displayed channels to the administrator account.

In the above-described example, if one of the first mobile terminal 10 and the second mobile terminal 20 is disconnected from the broadcasting terminal 200, the second controller 250 may control a control authority of the mobile terminal 100 disconnected from the broadcasting terminal 200 to be handed over to another terminal.

For instance, if the first mobile terminal 10, which may be possibly designated to the administrator account for the channels A, B and C, is disconnected from the broadcasting terminal 200, the second controller 250 can control the second mobile terminal 20 to be designated to the administrator account for the channels A, B and C. Hence, the second mobile terminal 20 may be designated to the administrator account for the channels A to E.

In another instance, the second controller 250 may control the control authority of the mobile terminal 100 disconnected from the broadcasting terminal 200 to lapse. For instance, even if the first mobile terminal 10, which may be possibly designated to the administrator account for the channels A, B and C, is disconnected from the broadcasting terminal 200, the second mobile terminal 20 may still be designated to the user account for the channels A, B and C.

For example, while one of the channels A, B and C is displayed via the broadcasting terminal 200, if the first mobile terminal 10 is disconnected from the broadcasting terminal 200, since the second mobile terminal 20 is designated not to the administrator account but to the user account, the controller may wait for a reconnection of the first mobile terminal 10 having the administrator account for the channels A, B and C in order for the second mobile terminal 20 to manipulate the broadcasting terminal 200.

In the following description, the extensible linkage between the broadcasting terminal 200 and a plurality of the mobile terminals 100 in addition to the former operations of a plurality of the mobile terminals 100 and the broadcasting terminal 200, which are described with reference to FIG. 16, is explained in detail with reference to the accompanying drawings.

<Recommendation of Broadcast Channel Based on Preference of Mobile Terminal Users>

When a plurality of the mobile terminals 100 are connected to the broadcasting terminal 200 according to one embodiment of the present invention, the broadcasting terminal 200 may recommend a channel automatically by combining tastes of users of a plurality of the mobile terminals 100 or may control a broadcast channel to be determined according to decision by majority.

Figure 21:
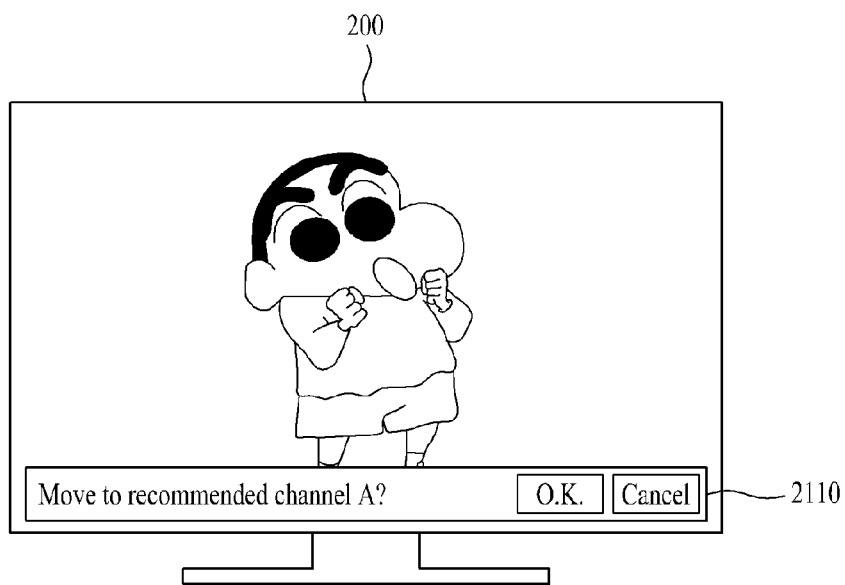
FIG. 21 is a diagram for one example to describe channel recommendation of a broadcasting terminal.

For instance, if the preferred channel of the first mobile terminal 10 and the preferred channel of the second mobile terminal 20 overlap with each other or a preferred program selected in common by both of the first mobile terminal 10 and the second mobile terminal 20 exists, referring to FIG. 21, the second controller 250 can control a popup window 2110, which is configured to switch a channel or guide a shift to the preferred program, to be displayed on the second display unit 230.

Using the remote controller menu, a user of each of the first mobile terminal 10 and the second mobile terminal 20 can control whether to move to the broadcast channel or broadcast program recommended by the popup window 2110. For the convenience of the users of the first mobile terminal 10 and the second mobile terminal 20 in making decisions, the second controller 250 can control a broadcast channel or a broadcast program to be changed based on the majority decisions made by the users of the first mobile terminal 10 and the second mobile terminal 20.

Figure 22:
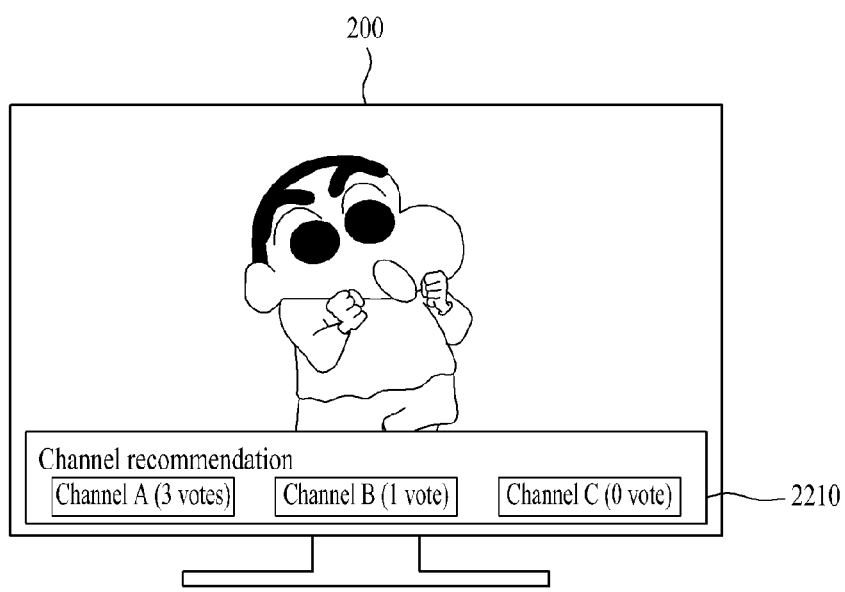
FIG. 22 is a diagram for one example that a broadcasting terminal switches a channel based on a decision by majority.

For instance, referring to FIG. 22, when 4 mobile terminals 100 are connected to the broadcasting terminal 200, the second controller 250 displays a popup window 2210 for channel recommendation and can then control a broadcast channel or program, which polls the largest number of votes made by the users of the 4 mobile terminals 100, to be output. In the example shown in FIG. 22, since the channel A has the largest number of votes, the second controller 250 may control the channel A to be output via the second display unit 230.

<Providing Information on Channel Watched at Turn-Off>

While the first mobile terminal 10 and the second mobile terminal 20 are connected to the broadcasting terminal 200, if the broadcasting terminal 200 is turned off by the first mobile terminal 10 or the second mobile terminal 20, the broadcasting terminal 200 can control information on a broadcast channel, which is output on turning off the broadcasting terminal 200, to be provided to each of the first mobile terminal 10 and the second mobile terminal 20.

By providing each of the first mobile terminal 10 and the second mobile terminal 20 with the watched channel information at the time of turning off the broadcasting terminal 200, the operations of the mobile terminals described with reference can be performed.

In doing so, when the broadcasting terminal 200 is turned off, if there is a broadcast channel watching-reserved by the second mobile terminal 20, the second controller 250 may provide the first mobile terminal 10 with the watched channel information at the time of turning off the broadcasting terminal 200 and may provide the second mobile terminal 20 with the watching-reserved broadcast channel information.

For instance, while the broadcasting terminal 200 is outputting a broadcast content received on the channel #6 and the channel #7 is watching-reserved by the second mobile terminal 20, if the broadcasting terminal 200 is turned off, the channel #6 may be provided as the watched channel information to the first mobile terminal 100 and the channel #7 may be provided as the watched channel information to the second mobile terminal 20.

Hence, if the broadcasting terminal 200 is turned on via the first mobile terminal 10, the broadcasting terminal 200 can initially output the broadcast content received on the channel #6 (cf. FIG. 5). On the other hand, if the broadcasting terminal 200 is turned on via the second mobile terminal 20, the broadcasting terminal 200 can initially output the broadcast content received on the channel #7 (cf. FIG. 5).

<Private Turn-off Operation>

The first mobile terminal 10 designated to the administrator account can turn off the broadcasting terminal 200 into private mode. Even if the broadcasting terminal 200 is turned off into the private mode, it is a matter of course that the aforementioned watched channel information can be provided to the mobile terminal 100.

After the broadcasting terminal 200 has been turned off into the private mode, if the broadcasting terminal 200 is turned on, the second controller 250 of the broadcasting terminal 200 can control the second display unit 230 to output an initial locked screen prior to outputting a broadcast content. In particular, the private mode may be usable in preventing the broadcasting terminal 200 from being watched by an unauthorized user. This is described in detail with reference to FIGS. 23A and 23B as follows.

Figure 23A:
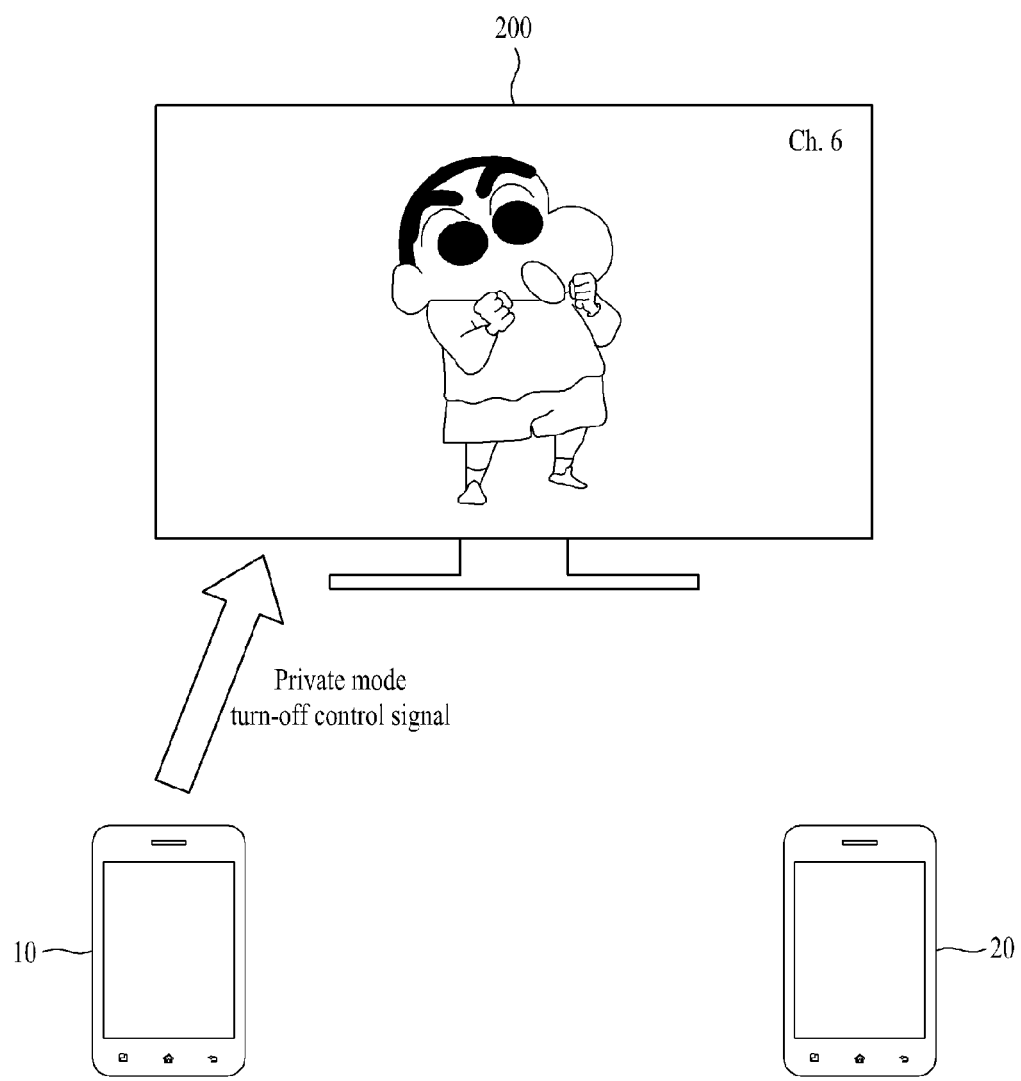
FIG. 23A and FIG. 23B are diagrams for one example of outputting a locked screen via a second display unit.
Figure 23B:
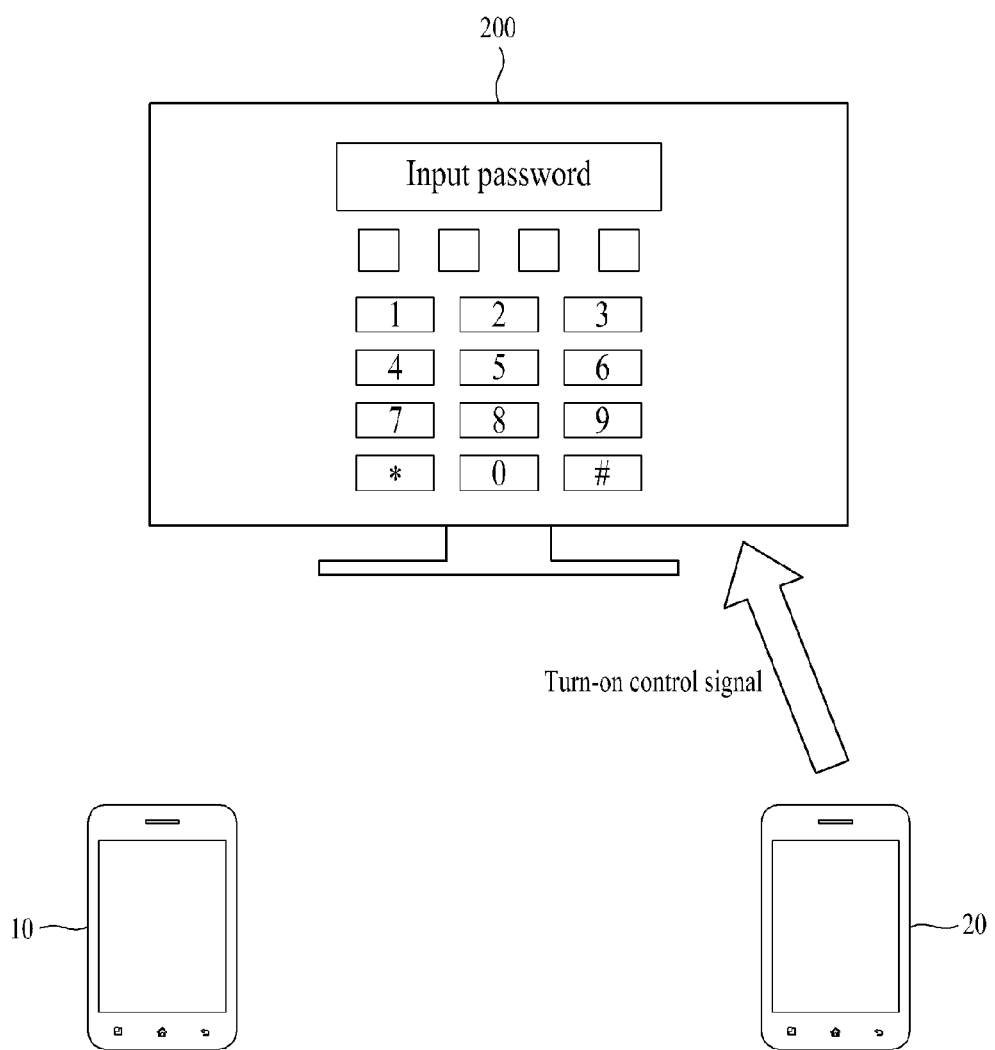

FIGS. 23A and 23B are diagrams for one example of outputting a locked screen via a second display unit. Referring to FIG. 23A, the first mobile terminal 100 may be set to a private mode through a remote controller menu. For instance, in the example shown in FIG. 23A, a user can set the first mobile terminal 10 to the private mode using a private mode button provided through a manipulation of the remote controller menu.

When the first mobile terminal 10 is set to the private mode, the user can further set up such a password for cancelling an unlocked screen as a PIN (personal identification number), a locking pattern and the like. While the first mobile terminal 10 is in the private mode, if the broadcasting terminal 200 is turned off via the first mobile terminal 10, the first mobile terminal 10 can provide the set password to the broadcasting terminal 200.

Thereafter, if the broadcasting terminal 200 is turned on by the first mobile terminal 10 or the second mobile terminal 20, referring to FIG. 23B, the second controller 250 of the broadcasting terminal 200 can control a locked screen to be output to the second display unit 230 prior to outputting a broadcast content. When the password received from the first mobile terminal 10 is input, the second controller 250 can control the locked screen of the second display unit 230 to be cancelled.

In particular, while the first mobile terminal 10 designated to the administrator account is in the private mode, as shown in the example shown in FIG. 23A and FIG. 23B, if the broadcasting terminal 200 is turned off, the broadcasting terminal 200 can control the initial locked screen to be output on turn-on operation. If the locked screen of the second display unit 230 is cancelled, the second controller 250 can output a broadcast channel matched to channel information received from the first mobile terminal 10 or the second mobile terminal 20.

In the example shown in FIGS. 23A and 23B, after the broadcasting terminal 200 has been turned off, if the broadcasting terminal 200 is turned on by one of the first mobile terminal 10 and the second mobile terminal 20, the locked screen can be displayed. According to another embodiment of the present invention, the second controller 250 of the broadcasting terminal 200 can discriminate the case that the broadcasting terminal 200 is turned on by the first mobile terminal 10 from the case that the broadcasting terminal 200 is turned on by the second mobile terminal 20.

For instance, if the broadcasting terminal 200 is turned on again by the first mobile terminal 10 having turned off the broadcasting terminal 200, the second controller 250 may control the broadcast channel, which is matched to the channel information provided by the first mobile terminal 10, to be output by skipping an output of the locked screen. On the other hand, if the broadcasting terminal 200 is turned on again by the second mobile terminal 20, the second controller 250 can control the locked screen to be output via the second display unit 230.

In particular, the second controller 250 can adjust whether to output the locked screen in accordance with whether the broadcasting terminal 200 is turned on by the mobile terminal 100 having turned off the broadcasting terminal 200 into the private mode.

In the examples shown in FIGS. 14 to 23B, the second controller 250 of the broadcasting terminal 200 designates one of a plurality of the mobile terminals 100 to the administrator account and also designates the rest of the mobile terminals 100 to the user accounts, whereby the first mobile terminal 10 designated to the administrator account has the priority of the control authority.

However, in the examples shown in FIGS. 14 to 23B, it may be unnecessary for a plurality of the mobile terminals 100 to have discriminated positions, respectively. According to another embodiment of the present invention, when a plurality of the mobile terminals are connected to the broadcasting terminal 200, the second controller 250 may control a plurality of the mobile terminals to have control authorities in equal position.

Accordingly, embodiments of the present invention provide various effects and/or features.

First of all, the present invention can provide a mobile terminal and a broadcasting terminal, by which user's convenience for manipulation can be enhanced.

In particular, the present invention enables a display and customized information of a content, which is intended by a user to be initially displayed on a broadcasting terminal, to be delivered to the broadcasting terminal, thereby providing convenient functions suitable for user's tastes on operating the broadcasting terminal.

Secondly, when a plurality of mobile terminals are connected to a broadcasting terminal, the present invention can distribute control authorities to a plurality of the mobile terminals reasonably.

It will be appreciated by those skilled in the art that the mobile terminal 10 and the broadcasting terminal 200 of the present invention mentioned in the foregoing description can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display unit configured to display information;
a wireless communication unit configured to wirelessly communicate with a broadcasting terminal; and
a controller configured to:
transmit a turn-on control signal to the broadcasting terminal for turning on the broadcasting terminal, and
when the broadcasting terminal receives a channel changing signal from another terminal while the broadcasting terminal outputs a first broadcast content of a first broadcasting channel, receive a query message to query whether to apply the channel changing signal to the broadcasting terminal from the broadcasting terminal,
wherein the query message comprises a preview image of a second broadcasting of a second broadcast channel and the controller is further configured to control the preview image to be displayed on the display unit.

2. The mobile terminal of claim 1, wherein the controller is further configured to transmit the channel information to the broadcasting terminal together with the turn on signal to control the broadcasting terminal to output a broadcast content received on a broadcast channel matched to the transmitted channel information when the broadcasting terminal is turned on, and the channel information comprises at least one of a preferred channel of a user of the mobile terminal and a channel last watched by the user.

3. The mobile terminal of claim 1, wherein the controller is further configured to display an indicator on the display unit to indicate that a connection to the broadcasting terminal has been completed.

4. The mobile terminal of claim 3, wherein the controller is further configured to display a remote controller menu on the display unit for remotely controlling the broadcasting terminal based on a selection of the indicator.

5. The mobile terminal of claim 4, wherein the remote controller menu comprises a track pad region for manipulating a cursor displayed on the broadcasting terminal.

6. The mobile terminal of claim 1, wherein the memory is further configured to store additional data and the controller is further configured to transmit the additional data to the broadcasting terminal together with the channel information.

7. The mobile terminal of claim 6, wherein the memory is further configured to store layout information including positions for outputting the broadcast content and the additional data on a display unit of the broadcasting terminal, and
wherein the controller is further configured to transmit the layout information to the broadcasting terminal and control the broadcasting terminal to output the broadcast content and the additional data on the display unit of the broadcasting terminal in accordance with the layout information.

8. A broadcasting terminal comprising:
a display unit configured to display information;
a memory configured to store data;
a broadcast receiving unit configured to receive a broadcast signal from a broadcast managing server;
a wireless communication unit configured to communicate with a first mobile terminal and a second mobile terminal; and
a controller configured to:
turn on the broadcasting terminal based on a turn-on control signal from the first of second mobile terminal,
output a first broadcast content of a first broadcast channel on the display unit,
wherein, when the broadcasting terminal receives a channel changing signal from one of the first or the second mobile terminals, the controller is further configured to transmit a query message to the other of the first and the second mobile terminals, and
wherein the query message comprises a preview image of a second broadcast content of a second broadcast channel indicated by the channel changing signal.

9. The broadcasting terminal of claim 8, wherein the wireless communication unit is further configured to receive a channel information with the turn on signal and the controller is further configured to control the first broadcast channel matched to the channel information to be tuned when the broadcast terminal is turned on.

10. The broadcasting terminal of claim 8, wherein the wireless communication unit is further configured to receive layout information from the first mobile terminal, and
wherein the controller is further configured to determine output positions of the first and second regions based on the layout information.

11. The broadcasting terminal of claim 8, wherein, one of the first and second mobile terminals is designated as an administrator account and the other of the first and second mobile terminals is designated as a user account.

12. The broadcasting terminal of claim 11, wherein, when the broadcasting terminal receives the channel changing signal from one of the first and second mobile terminals designated as the administrator account, the controller is further configured to instantly change from the first broadcasting channel to the second broadcasting channel without transmitting the query message.

13. The broadcasting terminal of claim 11, wherein, when the broadcasting terminal receives the channel changing signal from one of the first and second mobile terminals designated as the user account, the controller is configured to transmit the query message to the other of the first and second mobile terminals designated as the administrator account.

14. The broadcasting terminal of claim 13, wherein, when a signal indicating that agreement on applying the channel changing signal from one of the first and second mobile terminals that receives the query message, the controller is further configured to change from the first broadcasting channel to the second broadcasting channel.

15. The broadcasting terminal of claim 11, wherein, when the channel changing signal is received from one of the first and second mobile terminals designated as the user account, the controller is further configured to control the broadcast channel indicated by the channel changing signal to be reserved for watching.

16. The broadcasting terminal of claim 15, wherein the controller is further configured to display a waiting queue including pending watching reservation information on the display unit.

17. The broadcasting terminal of claim 15, wherein after the first broadcast content has ended, the controller is further configured to change from the first broadcast channel to the second broadcast channel.

18. The broadcasting terminal of claim 15, wherein, when one of the first and second mobile terminals designated as the administrator account is disconnected from the wireless communication unit, the controller is further configured to change from the first broadcast channel to the second broadcast channel.

19. The broadcasting terminal of claim 11, wherein, when the channel changing signal is received from said one of the first and second mobile terminals designated as the user account, the controller is further configured to maintain the displaying of the first broadcast content on a first region of the display unit and control the second broadcast content received from the second broadcast channel to be displayed on a second region of the display unit.

20. The broadcasting terminal of claim 19, wherein the second region comprises PIP (picture in picture) of the first region.

21. The broadcasting terminal of claim 11, wherein the controller is further configured to designate the administrator account and the user account based on order of the first and second mobile terminals being connected to the wireless communication unit.

22. The broadcasting terminal of claim 11, wherein the controller is further configured to designate the first mobile terminal having transmitted the turn-on control signal as the administrator account and designate the second mobile terminal not related to the turn-on control signal to the user account.

23. The broadcasting terminal of claim 11, wherein while a preferred channel of the first mobile terminal is being output via the display unit, the controller is further configured to designate the first mobile terminal as the administrator account, and
wherein while a preferred channel of the second mobile terminal is being output via the display unit, the controller is further configured to designate the second mobile terminal as the administrator account.

24. The broadcasting terminal of claim 11, wherein, when the channel change signal is received from one of the first and second mobile terminals designated as the user account, the controller is further configured to display an indicator indicating that the channel change signal is received from the user account.

25. The broadcasting terminal of claim 8, wherein, when an event occurrence signal is received from the first mobile terminal, the controller is further configured to pause a playback of the broadcast content until receiving an event end signal.

26. The broadcasting terminal of claim 8, wherein, when an event occurrence signal is received from the first mobile terminal, the controller is further configured to provide the first mobile terminal with recording data running from a timing point of receiving the event occurrence signal to a timing point of receiving an event end signal indicating that the event corresponding the event occurrence signal has ended.

27. A method of controlling a mobile terminal, the method comprising:
transmitting, via a wireless communication unit, a turn-on control signal to the broadcasting terminal for turning on the broadcasting terminal;
when the broadcasting terminal receives a channel changing signal from another terminal while the broadcasting terminal outputs a first broadcast content of a first broadcasting channel, receiving a query message to query whether to apply the channel changing signal to the broadcasting terminal from the broadcasting terminal,
wherein the query message comprises a preview image of a second broadcasting of a second broadcast channel and the preview image is displayed on the display unit of the mobile terminal when the mobile terminal receives the query message from the broadcasting terminal.

28. A method of controlling a broadcasting terminal, the method comprising:
receiving, via a wireless communication unit, a turn-on control signal from a first mobile terminal or a second mobile terminal;
turning on, via a controller, the broadcasting terminal based on the received turn-on control signal;
outputting, a first broadcast content of a first broadcasting channel on a display unit;
receiving a channel changing signal from one of the first and second mobile terminals; and
transmitting a query message to the other of the first and second mobile terminals,
wherein the query message comprises a preview image of a second broadcasting content of a second broadcast channel indicated by the channel changing signal.

* * * * *